(12) United States Patent
Zilberman et al.

(10) Patent No.: US 8,503,584 B2
(45) Date of Patent: Aug. 6, 2013

(54) EFFICIENT IMPLEMENTATION OF M-ALGORITHM BASED ON QR DECOMPOSITION FOR HIGHER-ORDER CONSTELLATIONS

(75) Inventors: Gennady Zilberman, Hod-ha-Sharon (IL); Eliahou Arviv, Modiin (IL); Daniel Briker, Kfar-Saba (IL); Gil Naveh, Modiin (IL); Moshe Bukris, Rishon le Zion (IL)

(73) Assignee: LSI Corporation, San Jose, CA (US)

( * ) Notice: Subject to any disclaimer, the term of this patent is extended or adjusted under 35 U.S.C. 154(b) by 343 days.

(21) Appl. No.: 12/974,039

(22) Filed: Dec. 21, 2010

(65) Prior Publication Data

US 2012/0155579 A1 Jun. 21, 2012

(51) Int. Cl.
 *H04L 27/06* (2006.01)

(52) U.S. Cl.
 USPC ........... 375/340; 375/341; 375/346; 375/262; 375/316; 714/794; 714/795; 714/796

(58) Field of Classification Search
 USPC .......... 375/340, 341, 346, 262, 316; 714/794, 714/795, 796
 See application file for complete search history.

(56) References Cited

U.S. PATENT DOCUMENTS

| | | | |
|---|---|---|---|
| 2008/0056396 A1 | 3/2008 | Li | |
| 2009/0190683 A1 | 7/2009 | Awater et al. | |
| 2009/0213965 A1* | 8/2009 | Maeda et al. | 375/341 |

\* cited by examiner

*Primary Examiner* — Leila Malek
(74) *Attorney, Agent, or Firm* — Otterstedt, Ellenbogen & Kammer, LLP

(57) ABSTRACT

A method of detecting received data in a communication system includes the steps of: performing a QR decomposition on a received input vector as a function of one or more characteristics of a communication channel over which the input vector was transmitted; generating a subset of best symbol candidates from a symbol constellation by comparing an input sample (corresponding to an element of the input vector) with one or more prescribed thresholds; identifying at least one symbol satisfying prescribed minimum Euclidian distance criteria among multiple ambiguity symbols in the subset of best symbol candidates; and generating a subset of best symbols including a prescribed number of symbols from the symbol constellation determined to be closest to the input sample. The subset of best symbols is used in a subsequent iteration of the steps of generating the subset of best symbol candidates and identifying at least one symbol satisfying the prescribed minimum Euclidian distance criteria.

23 Claims, 15 Drawing Sheets

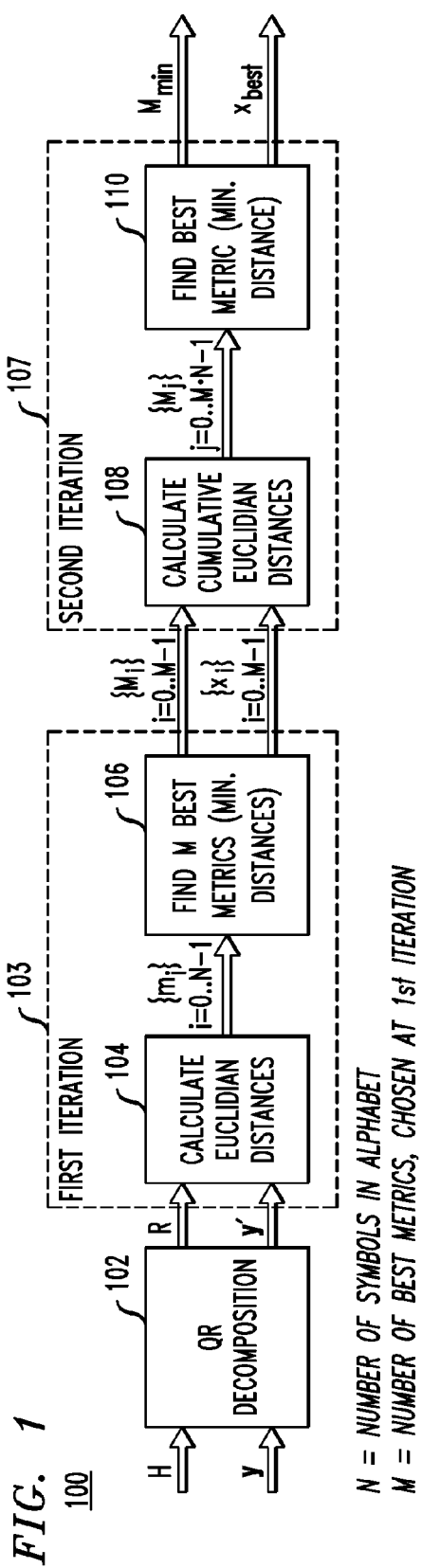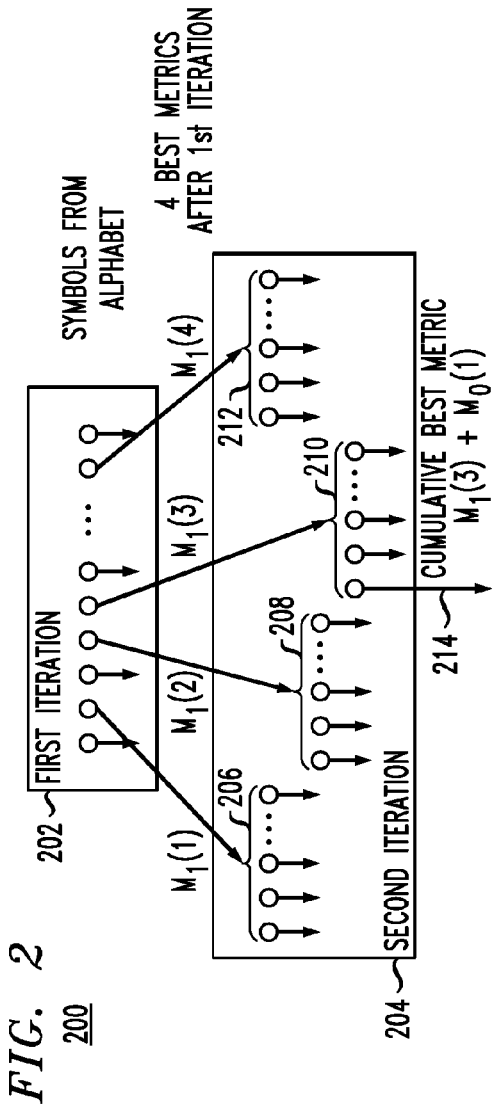

300

400

500

FIG. 6
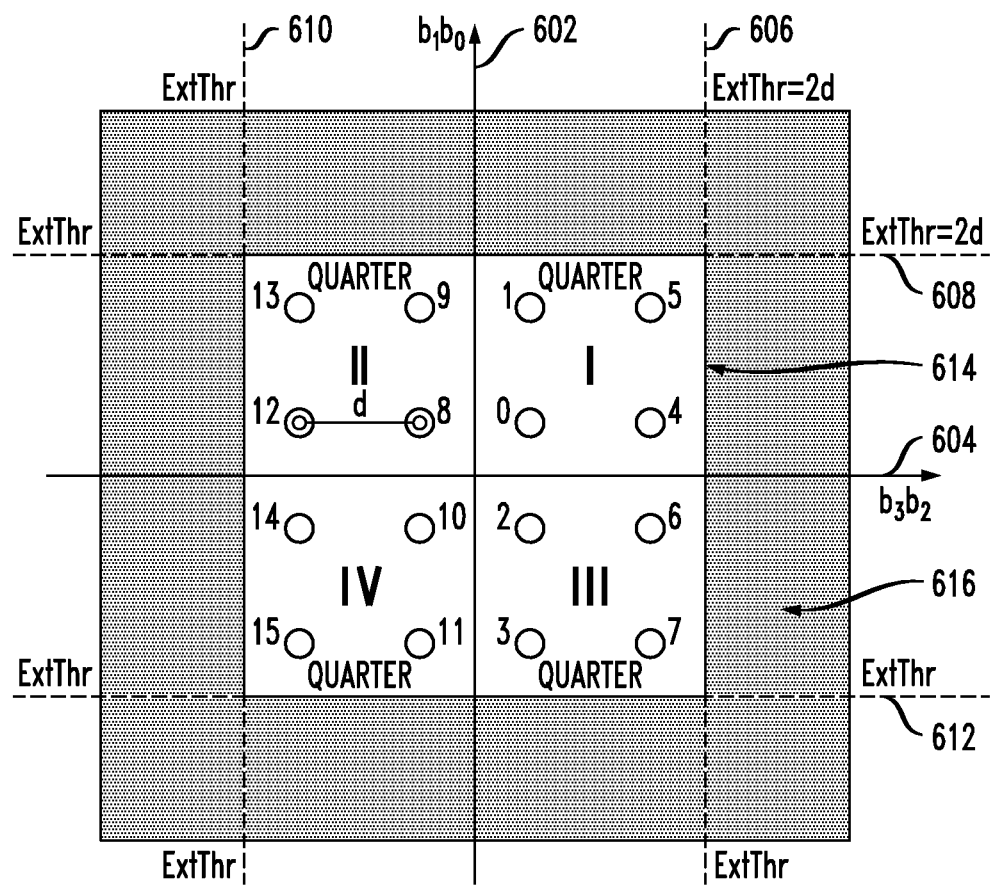
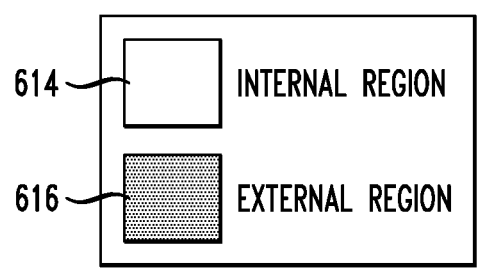

1700

1800

1900

2000

2100

2200

2400

2500

EFFICIENT IMPLEMENTATION OF M-ALGORITHM BASED ON QR DECOMPOSITION FOR HIGHER-ORDER CONSTELLATIONS

FIELD OF THE INVENTION

The present invention relates generally to the electrical, electronic, and computer arts, and more particularly relates to data communications techniques.

BACKGROUND OF THE INVENTION

In modern wireless communication systems, there is a persistent push for higher data rates and throughput. Multiple-Input Multiple-Output (MIMO) and Orthogonal Frequency Division Multiplexing (OFDM) are two known technologies for increasing wireless network capacity which have been adopted in various communication standards, such as, for example, the Institute of Electrical and Electronics Engineers (IEEE) 802.11n standard (see, e.g., IEEE Std 802.11n, "IEEE Standard for Information technology—Telecommunications and information exchange between systems—Local and metropolitan area networks—Specific requirements Part 11: Wireless LAN Medium Access Control (MAC) and Physical Layer (PHY) Specifications Amendment 5: Enhancements for Higher Throughput," 2009, the disclosure of which is incorporated by reference herein in its entirety for all purposes), and the IEEE 802.16e standard (see, e.g., IEEE Std 802.16, "IEEE Standard for Local and metropolitan area networks Part 16: Air Interface for Broadband Wireless Access Systems," 2009, and amendments thereto, the disclosures of which are incorporated by reference herein in their entireties for all purposes).

Received data detection in MIMO and OFDM communication systems has been challenging, primarily because each received signal is a superposition of simultaneously transmitted signals weighted by their corresponding channels. In theory, Maximum Likelihood Detection (MLD) is an optimal solution for received data detection. However, the computational complexity of an MLD approach increases exponentially with data throughput and is therefore unfeasible in high data rate MIMO systems. Several detection algorithms for MIMO systems achieving near-MLD performance have been proposed. For example, a QR decomposition with M-algorithm (QRD-M) scheme reduces the complexity by selecting M candidates with the smallest accumulated metrics at each level of the tree search. However, to achieve near-MLD performance for a QRD-M algorithm, M should be made large, thereby necessitating higher computational complexity, which is undesirable.

SUMMARY OF THE INVENTION

Principles of the invention, in illustrative embodiments thereof, advantageously provide an efficient QRD-M algorithm for higher order constellations in an OFDM or other communication system. Aspects of the invention eliminate the necessity of calculating Euclidian distances over all symbols in order to determine a maximum likelihood solution. In this manner, techniques of the invention advantageously reduce computational complexity without impacting system performance.

In accordance with one embodiment of the invention, a method of detecting received data in a communication system includes the steps of: performing a QR decomposition on a received input vector as a function of one or more characteristics of a communication channel over which the input vector was transmitted; generating a subset of best symbol candidates from a symbol constellation by comparing an input sample with one or more prescribed thresholds, the input sample corresponding to an element of the received input vector; identifying at least one symbol satisfying prescribed minimum Euclidian distance criteria among multiple ambiguity symbols in the subset of best symbol candidates; and generating a subset of best symbols, the subset of best symbols including a prescribed number of symbols from the symbol constellation determined to be closest to the input sample. The subset of best symbols is used in a subsequent iteration of the steps of generating the subset of best symbol candidates and identifying at least one symbol satisfying the prescribed minimum Euclidian distance criteria.

In accordance with another embodiment of the invention, a method of implementing at least a portion of a QR decomposition with M-algorithm for detecting received data in a communication system includes the steps of: dividing a symbol constellation corresponding to the communication system into multiple internal sectors and external sectors as a function of at least one characteristic of the communication system and on at least one user-definable parameter; generating a set of thresholds for defining boundaries between the respective internal sectors and external sectors; generating a first look-up table including a first subset of sure symbols and a first subset of ambiguity symbols, the first subset of sure symbols including two or more symbols in at least one of the internal sectors that are associated with a subset of best symbols, the subset of best symbols including a prescribed number of symbols in the constellation determined to be closest to an input sample corresponding to a received input vector, the first subset of ambiguity symbols including two or more symbols in at least one of the internal sectors that have a prescribed likelihood of being associated with the subset of best symbols; generating at least a second look-up table including a second subset of sure symbols and a second subset of ambiguity symbols, the second subset of sure symbols including two or more symbols in at least one of the external sectors that are associated with the subset of best symbols, the second subset of ambiguity symbols including two or more symbols in at least one of the external sectors that have a prescribed likelihood of being associated with the subset of best symbols; determining in which of the respective internal and external sectors the input sample resides; identifying at least one symbol in the first and/or second subsets of ambiguity symbols that satisfies prescribed minimum Euclidian distance criteria as a function of a location of the input sample in the constellation; and generating the subset of best symbols including symbols stored in one of the first and second look-up tables as a function of the location of the input sample in the constellation for use in a subsequent iteration of one or more steps of the method.

In accordance with yet another embodiment of the invention, an apparatus for detecting received data in a communication system includes at least one processor. The processor is operative: (i) to perform a QR decomposition on a received input vector as a function of one or more characteristics of a communication channel over which the input vector was transmitted; (ii) to generate a subset of best symbol candidates from a symbol constellation corresponding to the communication system by comparing an input sample with one or more prescribed thresholds, the input sample corresponding to an element of the received input vector; (iii) to identify at least one symbol satisfying prescribed minimum Euclidian distance criteria among a plurality of ambiguity symbols in the subset of best symbol candidates; and (iv) to generate a subset of best symbols, the subset of best symbols including a prescribed number of symbols from the symbol constellation determined to be closest to the input sample. The subset of best symbols is used in a subsequent iteration of the steps of generating the subset of best symbol candidates and identifying at least one symbol satisfying the prescribed minimum Euclidian distance criteria.

These and other features, objects and advantages of the present invention will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals indicate corresponding elements throughout the several views, and wherein:

FIG. 1 is a block diagram depicting at least a portion of an exemplary 2×2 QRD-M methodology, which may be modified according to aspects of the invention;

FIG. 2 is a graphical representation conceptually illustrating the exemplary M-algorithm shown in FIG. 1;

FIG. 6 is a symbol constellation diagram illustrating an exemplary methodology for determining whether a given received symbol resides within or outside defined regions of the symbol constellation, according to an embodiment of the invention;

Figure 3:
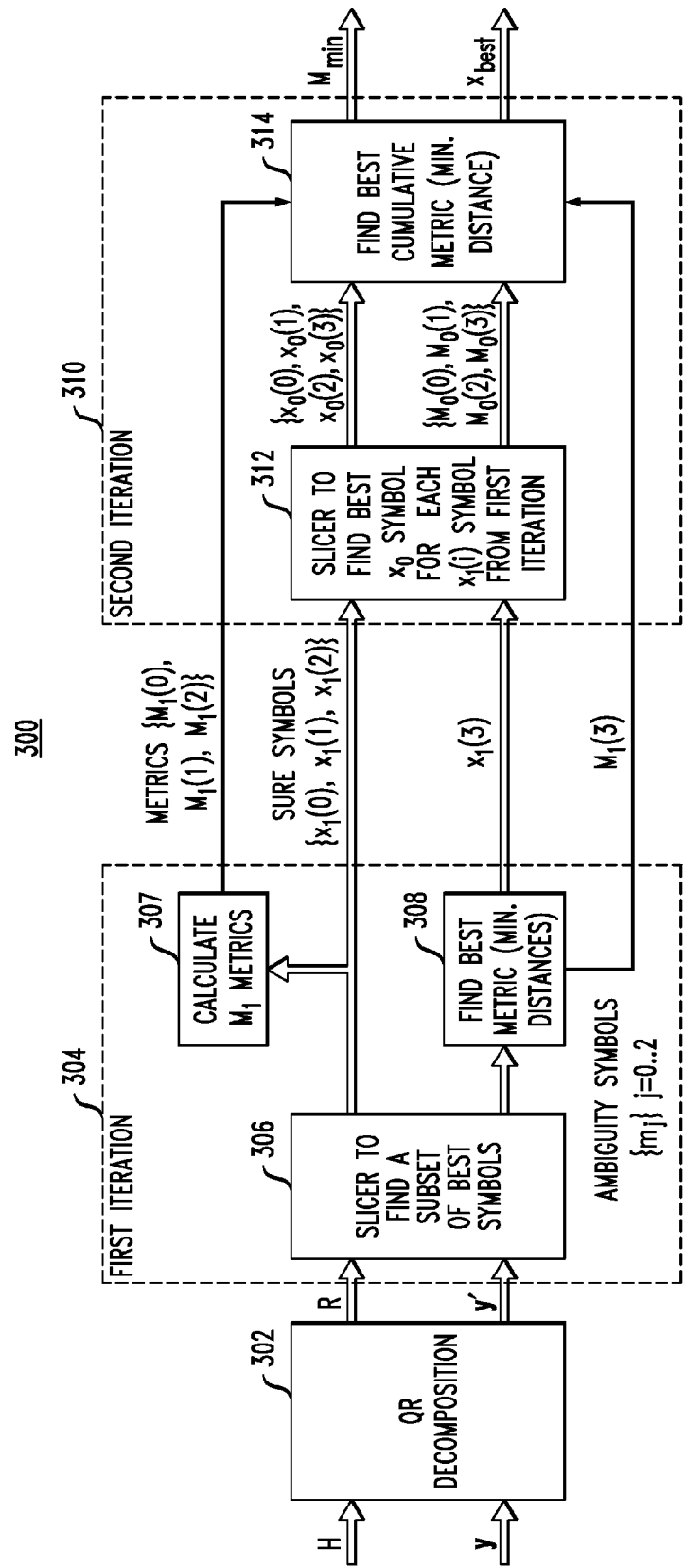
FIG. 3 is a block diagram depicting at least a portion of an exemplary 2×2 QRD-M methodology, according to an embodiment of the invention.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION OF PREFERRED EMBODIMENTS

Principles of the present invention will be described herein in the context of illustrative embodiments of methods and apparatus for efficiently implementing a QRD-M algorithm for higher order constellations in an OFDM transceiver. It is to be appreciated, however, that the invention is not limited to the specific methods and apparatus illustratively shown and described herein. Rather, aspects of the invention are directed broadly to signal detection techniques having reduced computational complexity compared to standard approaches without significantly impacting system performance.

While illustrative embodiments of the invention will be described herein with reference to specific wireless communication protocols, including, but not limited to IEEE 802.11n and IEEE 802.16e, transceiver architectures, modulation schemes, etc., it is to be understood that the invention is not limited to use with these or any particular communication protocols, transceiver architectures or modulation schemes. Rather, principles of the invention may be extended to essentially any suitable communication protocols, modulation schemes, signal detection apparatus, etc. Moreover, it will become apparent to those skilled in the art given the teachings herein that numerous modifications can be made to the embodiments shown that are within the scope of the present invention. That is, no limitations with respect to the specific embodiments described herein are intended or should be inferred.

As previously stated, received data detection in wireless communication systems, such as, for example, MIMO and OFDM systems, has been challenging, primarily because each received signal is a superposition of simultaneously transmitted signals weighted by their corresponding channels. In terms of performance, maximum likelihood detection (MLD) offers an optimal solution for received data detection. However, the computational complexity of MLD essentially renders this approach unfeasible for high data rate communication systems. The QRD-M algorithm is a signal detection scheme that is frequently used in OFDM or orthogonal frequency division multiple access (OFDMA) transceivers (e.g., utilizing Worldwide Interoperability for Microwave Access (WiMAX) or Long-Term Evolution (LTE) standards). This algorithm represents a simplified approach to the "ideal" MLD scheme. But to achieve performance comparable to MLD, the number of candidates M should be made large, thereby necessitating higher computational complexity.

FIG. 1 is a block diagram 100 depicting at least a portion of an exemplary 2×2 QRD-M methodology, which may be modified according to aspects of the invention. The QRD-M approach comprises two phases: (i) performing a QR decomposition of an input channel matrix (H) and a received vector (y) for obtaining a simplified representation (R) of the channel matrix, R being an upper triangular matrix; and (ii) performing an M-algorithm implementation to search for a suboptimal maximum likelihood (ML) solution. Since the R-matrix has an upper triangular form, this mechanism can be implemented at any stage of the QRD-M algorithm of any order (N×N), due to its recursive structure. In order to simplify the discussion, a 2×2 matrix will be illustrated which requires two iterations of the M-algorithm, as shown in the figure. For higher order matrices, more iterations would be required to perform the M-algorithm, as will be understood by those skilled in the art. A model representation in the case of a 2×2 scheme (e.g., two users and two receive antennas) may be defined as follows:

$$y = Hx + n \quad (1)$$

$$\begin{bmatrix} y_0 \\ y_1 \end{bmatrix} = \begin{bmatrix} h_{00} & h_{01} \\ h_{10} & h_{11} \end{bmatrix} \cdot \begin{bmatrix} x_0 \\ x_1 \end{bmatrix} + \begin{bmatrix} n_0 \\ n_1 \end{bmatrix}$$

where n represents an additive white Gaussian noise (AWGN) vector, x represents a transmitted signal, H is the channel matrix, and y represents the signal received at an antenna.

A QR decomposition block 102 is operative to receive as inputs the channel matrix H and received vector y and perform a QR decomposition. In a QR detection algorithm, the QR decomposition of the channel matrix H can be obtained as follows (assuming H is positive):

$$H = QR$$

$$y = Hx + n = QRx + n \quad (2)$$

where Q is a unitary matrix (i.e., a matrix whose inverse is equal to the complex conjugate of its transpose; $Q^H \cdot Q = 1$, where $Q^H$ is the conjugate transpose of matrix Q) and R is an upper triangular matrix of the form:

$$R = \begin{bmatrix} r_{00} & r_{01} \\ 0 & r_{11} \end{bmatrix} \quad (3)$$

In order to eliminate Q in equation 2 above, each term is multiplied by $Q^H$ to obtain:

$$Q^H y = Q^H \cdot QRx + Q^H n$$

$$y' = Rx + n', \quad (4)$$

where $y' = Q^H y$ and $n' = Q^H n$. As used herein, the prime symbol ("'") represents the input signal y after QR decomposition. Now, the Euclidian distance between received samples and corresponding estimated symbols is defined as follows:

$$\|y' - Rx\|^2 = |y_1' - r_{1,1} \cdot \hat{x}_1|^2 + |y_0' - r_{00} \cdot \hat{x}_0 - r_{01} \cdot \hat{x}_1|^2 \quad (5)$$

$$\hat{x}_i \subset A,$$

where A is a set of constellation symbols. This representation leads to the following recursive expression:

$$\mu_1 = \|y_1' - r_{1,1} \cdot \hat{x}_1\|^2$$

$$\mu_0 = \mu_1 + \|\tilde{y}_0' - r_{0,0} \cdot \hat{x}_0\|^2, \tilde{y}_0' = y_0' - r_{0,1} \cdot \hat{x}_1 \quad (6)$$

Once the QR decomposition is obtained in block 102, an M-algorithm is performed in two iterations, as stated above. The ML solution, in the case of AWGN, leads to searching over a symbol's vector $$\tilde{x} = \begin{bmatrix} x_0 \\ x_1 \end{bmatrix}$$

such that it will lead to a minimum Euclidian distance $\min\{\|y - Hx\|^2\}$. In order to reduce the complexity of the ML calculation, the M-algorithm is applied to produce $M_a$ survived candidates to update channel metrics. By way of illustration only, consider a case where $M_a = 4$ (number of best metrics, chosen at a first iteration of the M-algorithm).

The parameter $M_a$ is preferably predefined (e.g., by a system developer) in order to meet certain desired performance requirements. The illustrative embodiment of the invention described herein is optimized for $M_a = 4$, since such case is well-suited for a digital signal processor (DSP) implementation (e.g., an SC3400e StarCore DSP core, commercially available from Freescale Semiconductor, Inc., has four data arithmetic logic units (DALU) and 16 data registers). In the context of 16-QAM, two values for the parameter $M_a$ are often used; namely, $M_a = 8$ and $M_a = 4$. For $M_a = 8$, performance improves by about 1-2 dB in comparison to $M_a = 4$, however $M_a = 4$ is a reasonable value for implementation purposes and offers a benefit of lower system overhead/complexity. It is to be understood, however, that principles of the invention can be implemented for essentially any value of $M_a$; a primary difference will be in a selection of slicing thresholds and candidate symbol subsets, as will become apparent to those skilled in the art given the teachings herein below.

With continued reference to FIG. 1, during a first iteration 103 of the M-algorithm, Euclidian distances (i.e., metrics) are calculated in block 104 using the matrix R, obtained by the QR decomposition of the channel matrix H, and modified (as in equation (4) above) input vector y'. Euclidian distances (metrics) are calculated over all symbols from a given modulation alphabet A (e.g., 16 symbols for 16-QAM):

$$M_1(i) = \|y_1' - r_{1,1} \cdot x_i\|^2, x_i \subset A \quad (7)$$

Next, M best metrics (i.e., minimum Euclidian distances) are determined in block 106. In this illustration, $M_a = 4$ minimum metrics are selected from the obtained distances for use in a second iteration 107 of the M-algorithm.

During the second iteration 107, for each obtained metric (i.e., $M_1(i)$, $i = 0, 1, 2, 3$) and appropriate symbols (i.e., $\hat{x}_i$, $i = 0, 1, 2, 3$), block 108 calculates cumulative Euclidian distances by performing the following:

Update input symbol $y_0'$:

$$y_{0,i}' = y_0' - r_{0,1} \cdot \hat{x}_i \quad (8)$$

Calculate the final metric (Euclidian distance) over all symbols from the given modulation alphabet:

$$M_0(i,j) = \|y_{0,i}' - r_{0,0} \cdot x_j\|^2 + M_1(i), \quad (9)$$

Next, block 110 selects the minimum final metric and obtains a best $\hat{x} = [\hat{x}_0, \hat{x}_1]'$ solution vector ($x_{best}$):

$$\hat{x} = \arg\min_{i,j \subset A}(M_0(i,j)) \quad (10)$$

FIG. 2 is a graphical representation 200 which conceptually illustrates the exemplary QRD-M methodology 100 shown in FIG. 1. As apparent from FIG. 2, in a first 202 of the M-algorithm, four best metrics (i.e., minimum Euclidian distances), $M_1(1)$, $M_1(2)$, $M_1(3)$ and $M_1(4)$, are selected from all symbols in a given alphabet. These four best metrics are then used in a second iteration 204 of the M-algorithm. During the second iteration 204, a cumulative Euclidian distance for each of the best metrics obtained from the first iteration 202 is calculated over all symbols in the given alphabet to thereby generate four sets of cumulative Euclidian distances 206, 208, 210 and 212, each set corresponding to a given one of the best metrics (see equations 8 and 9 above). Then, a best metric from the four sets of cumulative Euclidian distances 206, 208, 210 and 212 is determined to thereby generate a cumulative best metric 214 and a corresponding best symbol.

According to the recursive structure of equation 6 above, QRD-M used the M-algorithm to produce $M_a$ survivor candidates. Data $x_1$ associated with the strongest channel is allocated as a root node in the first iteration 202 (stage 1). At this stage, there are C candidate points to detect, where C is a size of the symbol alphabet A. For a $M_a$ limited tree search, the metric at each stage is sorted and only the $M_a$ smallest branches are maintained as survivor branches. Then, in the next iteration 204 (stage 2), the derived C metrics from each of the $M_a$ survivor branches are computed and added to the aggregate metrics of the previous survivor branches to form a $M_a \cdot C$ metric sequence. This sequence is sorted again and only the $M_a$ smallest branches survive until the next stage. For each stage there are at most $M_a \cdot C$ metric branches to compute instead of $C^p$ branches at the p-th stage for the full tree search in a conventional ML detector. Thus, the complexity of the QRD-M approach depends upon $M_a$.

A straightforward implementation of the above steps performed by the QRD-M methodology 100 requires a large number of computations; namely, to calculate Euclidian distances (metrics) for the whole alphabet set, and to sort the obtained metrics and select the $M_a$=4 best metrics. Such computational complexity is undesirable, particular in high data rate communication systems (i.e., for higher-order constellations).

Advantageously, an aspect of the invention, in embodiments thereof, significantly reduces the number of required computations by performing slicing, thereby accelerating the selection of the M best constellation symbols, corresponding to the M best metrics (i.e., minimum distances to a received sample) during the first iteration of the M-algorithm. The novel slicing methodology is an efficient implementation of the ML solution. The invention primarily focuses on improving the efficiency of the M-algorithm since the M-algorithm represents the most computationally complex portion of the QRD-M approach.

By way of example only and without loss of generality, consider for simplicity a one-dimensional case. For a given received input sample $y_0'$, the ML solution is one that has a minimal Euclidian distance:

$$\hat{x} = \arg\min(\|y_0' - r(0,0) \cdot x_i\|^2), \quad (11)$$

$$x_i \subset A$$

A similar result may be achieved using a slicing procedure to compare the received sample $y_0'$ to prescribed thresholds in order to determine the most likely symbol from alphabet set A. For a 16-QAM scheme, one needs to perform three comparisons in a real axis and three comparisons in an imaginary axis, as will be described in further detail in connection with FIG. 4.

With reference now to FIG. 3, a block diagram 300 is presented depicting at least a portion of an exemplary 2×2 QRD-M methodology, according to an embodiment of the invention. While a 2×2 QRD-M methodology is described for simplicity (e.g., two users and two receive antennas), it is to be understood that the invention is not limited to any specific matrix size. Rather, techniques of the invention can be easily applied to a QRD-M system of any order (N×N), where N is an integer, as will become apparent to those skilled in the art given the teachings herein.

A QR decomposition block 302 is operative to receive as inputs a channel matrix H and a received vector y and to perform a QR decomposition to thereby generate as outputs an upper triangular matrix, R, and a corresponding received vector $y' = [y_0' \ y_1']^T$ based on the received input signal y. In a QR detection algorithm, the QR decomposition of the channel matrix H can be obtained using equations 2 through 4 above.

Once the QR decomposition is obtained in block 302, an M-algorithm is performed in two iterations to generate an ML solution, $x_{best}$, having a best cumulative metric (calculated according to the minimum Euclidian distance), $M_{min}$. However, rather than calculating Euclidian distances, which are computationally complex, techniques of the invention use a slicing methodology. Specifically, in a first iteration 304, a first slicer block 306 is operative to determine a subset of best symbol candidates, including, in this illustration, three "sure" symbols ($\{m_i\}$, i=0 ... 2) and a subset of three "ambiguity" symbols ($\{m_j\}$, j=0 ... 2).

In a specific region of a given symbol constellation near each "winner" symbol (i.e., an obtained symbol determined to be closest to a received sample) there will be at least two closest neighbor symbols in the constellation which have a high enough likelihood of meeting prescribed minimum distance criteria that there is no doubt about them belonging to the subset of $M_a$=4 best symbols, as long as the obtained symbol $y_1'$ falls inside this specific region. Such symbols are referred to herein as "sure" symbols. The two closest neighbor symbols together with the winner symbol forms the subset of three sure symbols.

By contrast, depending on particular region in the constellation, in this illustrative embodiment there will be two or three constellation symbols that we cannot be sure about whether or not they belong to the subset of $M_a$=4 best symbols until respective minimum Euclidian distances from these symbols to the obtained symbol $y_1'$ are determined (i.e., whether a given symbol is determined to be in the subset of $M_a$=4 best symbols depends upon where y' falls inside the constellation region). Such symbols having a prescribed likelihood of belonging to the subset of best symbols (but are not guaranteed to belong to the subset of best symbols) are referred to herein as "ambiguity" symbols and form the subset of ambiguity symbols. The symbol from the subset of ambiguity symbols having a minimum distance to the received sample will be added to the subset of sure symbols to thereby form the subset of $M_a$=4 best symbols.

Block diagram 300 further includes a metrics calculation block 307 which is operative to calculate corresponding metrics (Euclidian distances) $M_1(0)$, $M_1(1)$ and $M_1(2)$ for the subset of sure symbols. The ambiguity symbols are sent to block 308 which is operative to determine a best metric (i.e., minimum distance) from the subset of ambiguity symbols obtained in slicer block 306. The output of block 308 together with a group of sure symbols forms the subset of $M_a$ best symbols that are then used in a second iteration 310 of the exemplary 2×2 QRD-M methodology.

In the second iteration 310, a second slicer block 312 is operative to receive the sure symbols generated by the first slicer block 306 and the best symbol generated by block 308 from the set of ambiguity symbols and to generate a subset of $M_a$=4 best symbols, although the invention is not limited to any particular number of symbols in the subset. Block 312 then performs a slicing procedure (as will be described in further detail below in conjunction with FIG. 4) to determine the best symbols $\hat{x}_0(i)$, i=0, 1, 2, 3 corresponding to each one of the symbols $\hat{x}_1(i)$, i=0, 1, 2, 3 from the subset of $M_a=4$ best symbols generated from the previous iteration. Block 314 is operative to receive the set of best symbols from the second slicer block 312 and first iteration metrics from blocks 307 and 308 to thereby determine a best cumulative metric therefrom and a corresponding ML solution $[\hat{x}_0,\hat{x}_1]^T$. This novel slicing methodology will be described in further detail below. With regard to the slicing mechanism used in the second iteration 310 (e.g., second slicer block 312), any known slicing technique can be employed. An important aspect of the invention, according to embodiments thereof, is to use a slicing methodology for one or more intermediate stages of the M-algorithm (e.g., in a first iteration 304, in the illustrative case of 2×2 matrix) to find a subset of $M_a$ best symbols.

Briefly, according to an embodiment of the invention, the novel QRD-M approach preferably comprises the following steps:

1. Scale and/or define slicer thresholds for a given input sample $y_1'$ according to the diagonal element $r_{1,1}$ of the obtained R matrix generated by the QR decomposition in block 302; ExtThr=2·d·|$r_{1,1}$|, $$Thr_1 = \frac{d}{2} \cdot |r_{1,1}|,$$
$$Thr_2 = d \cdot |r_{1,1}|,$$

where d is indicative of a prescribed level. Note, that the slicer thresholds are scaled and/or defined for each input sample, according to the value of the diagonal element of the R-matrix. In the exemplary case of a 2×2 matrix, scaling is performed twice; once per each iteration (number of iterations=dimension of R-matrix). The input sample in such case is an element of vector y'.

Figure 7:
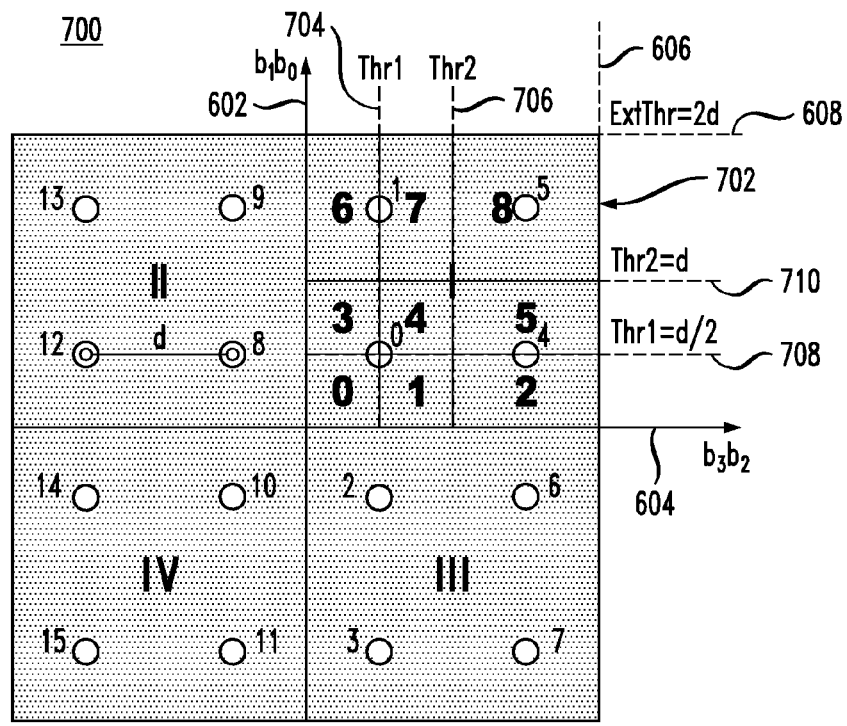
FIG. 7 is a symbol constellation diagram illustrating an exemplary methodology for subdividing a given quarter of an internal region of the symbol constellation, according to an embodiment of the invention.

2. Perform three comparisons in a real axis (i.e., real domain) and three comparisons in an imaginary axis (i.e., imaginary domain) in order to define a slicer index, as depicted in FIG. 7 for a case where the input sample falls inside an internal look-up table (i.e., within an internal region of the constellation) or in FIG. 18 for a case where the input sample falls outside (i.e., within an external region of the constellation). As will be described in further detail below, in the case where the input sample falls in an external region of the symbol constellation, two comparisons are performed between Re{$y_1'$} and Im{$y_1'$} using Thr2, then one comparison between Re{$y_1'$}< >Im{$y_1'$}, and one comparison in real or imaginary domain using Thr1. In either case, there will be a maximum of six comparison operations performed for the illustrative embodiment; namely, two comparisons to define whether the input sample resides in the internal region or the external region of the constellation, and four comparisons to define a winner sector inside a given region.

3. Access a look-up table or alternative storage element (e.g., data register, etc.) using the slicer index to obtain three "sure" symbols (i.e., a most likely symbol (winner symbol)—closest to the received sample—and its two closest neighbors) and three "ambiguity" symbols. The number of sure symbols and ambiguity symbols will change based on the number selected for $M_a$. For example, if the $M_a$ parameter increases, constellation regions (i.e., thresholds) may need to be redefined in order to include more candidate symbols. Depending on the $M_a$ parameter employed, new subsets of sure symbols (i.e., closest to the winner symbol) and ambiguity symbols can be found. Moreover, if a different constellation is used, the subsets of sure symbols and ambiguity symbols may need to be redefined. It is preferred if the $M_a$ parameter is a multiplication of two, although the invention is not limited to any specific value for the $M_a$ parameter. The determination of $M_a$ will be a function of the constellation geometry, as will be known by the skilled artisan. Regardless of the value selected for $M_a$ or the type of constellation geometry employed, the principle of using a slicer with subsets rather than looking for $M_a$ minimum Euclidian distances remains the same.

4. Find the corresponding metrics $M_1(i)$, i=0, 1, 2 from a set of sure symbols (as formulated in equation (18) below).

5. Find a minimum distance between a given received sample $y_1'$ and the three ambiguity symbols corresponding thereto in order to obtain a fourth most likely symbol to thereby complete a set of the $M_a$=4 best symbols:

$$\hat{x}_1(3)=\arg\min\{\|y_1'-r_{11}\cdot x_{j,1}\|^2, \|y_1'-r_{11}\cdot x_{j,2}\|^2, \|y_1'-r_{11}\cdot x_{j,3}\|^2\} \quad (12)$$

6. Form the subset of Ma best symbol candidates (e.g., best symbols and corresponding metrics) for the next iteration:

Mset={$M_1(0),M_1(1),M_1(2),M_1(3)$} is a $M_a$=4 subset of best metrics for the next iteration Xset={$\hat{x}_1(0),\hat{x}_1(1),\hat{x}_1(2),\hat{x}_1(3)$} is a $M_a$=4 subset of best symbols for the next iteration 7. Use the obtained subset of best symbols for the next iteration in order to update $y'_0$ as per equation (8) above and to find a corresponding $\hat{x}_0(i)$ using a slicer (as will be described below in connection with FIG. 4, where thresholds are defined and scaled as follows: $Thr_1=-d \cdot r_{0,0}$, $Thr_2=0$, $Thr_3=d \cdot r_{0,0}$).

8. A best (i.e., "winner") symbol, $\hat{x}_0(i)$, which is preferably indicative of the symbol closest to the received sample, is determined by a slicing procedure so as to avoid the computational burden of calculating Euclidian distances. Calculate corresponding metrics $M_0(i)$, i=0, 1, 2, 3 for each best symbol, $\hat{x}_0(i)$, obtained after slicing as follows:

$$M_0(i)=\|y_0'-r_{00}\hat{x}_0(i)\|^2, \quad (13)$$

where i=0, 1, 2, 3 are indexes of "winner" symbols.

9. Use the obtained subset of best metrics $M_1(i)$ and corresponding $M_0(i)$ in order to determine a final solution, according to the best cumulative metric, $M_{min}$=arg min($M_1(i)$ $M_0(i)$) for i=0, 1, 2, 3, as identified in equation (9) above.

10. The resulting vector that corresponds to the minimum cumulative metric is an ML solution $$\hat{x}_{best} = \begin{bmatrix} \hat{x}_0 \\ \hat{x}_1 \end{bmatrix}$$

for the input vector y transmitted through channel matrix H.

As previously stated, a mathematical representation of a QRD-M algorithm in the case of a 2×2 scheme (e.g., two users and two receive antennas) may be defined as shown in equation 1 above. The QRD-M methodology significantly reduces complexity, in at least one aspect, by reducing a set of candidate vectors for selection as a best metric. Rather than searching over all possible symbol vector combinations $$\tilde{x}_i = \begin{bmatrix} x_0 \\ x_1 \end{bmatrix}$$

(the number of combinations being $C^{Nx}$, where C is a size of symbol alphabet A and Nx is a number of users), the QRD-M approach focuses on $M_a$ best vectors that generate minimal metrics (i.e., minimum distances).

A computational drawback with standard implementations of the M-algorithm can be attributed to several factors, including, but not limited to, the necessity for calculating Euclidian distances between respective received samples $y_n$ and each symbol from a given constellation symbol alphabet A, and for sorting the obtained distances (i.e., metrics) in order to select the best $M_a$ branches with minimal metrics. Since the R-matrix has an upper-triangular form, each iteration of the M-algorithm (from the last element to the first element $y_0$) can be represented as a one-dimensional problem. A principle of the novel slicing method is demonstrated in further detail below, according to an embodiment of the invention. Without loss of generality and for clarity purposes, the follow description will refer to the one-dimensional problem (i.e., where y is a sample and not a vector). It is to be appreciated, however, that the techniques described herein may be extended in a similar manner to obtain a solution for the multi-dimensional case, as will become apparent to those skilled in the art given the teachings herein.

According to aspects of the invention, slicing is employed as an efficient alternative approach to obtain an ML solution for the following model:

$$y = hx + n, \quad (14)$$

where n is an AWGN sample, h is any complex number (channel sample) and x is a transmitted symbol. Rather than looking for the minimal Euclidian distance, as in a traditional ML approach, the slicing methodology according to an aspect of the invention preferably performs one or more comparisons of the received sample y to prescribed thresholds.

Figure 4:
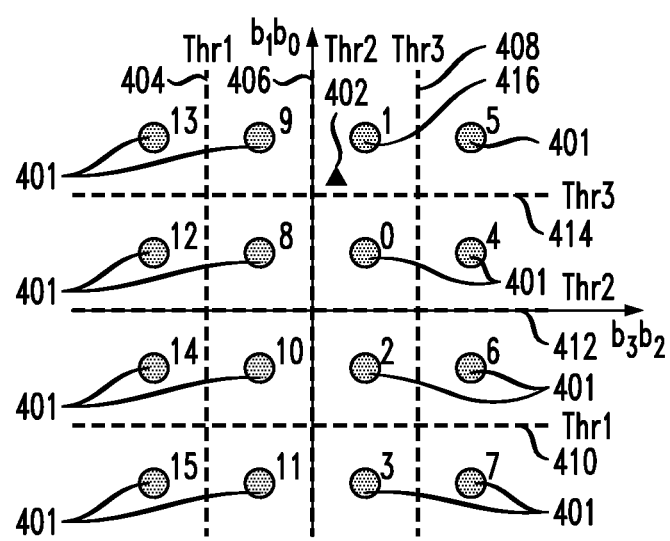
FIG. 4 is a conceptual view depicting an exemplary 16-point (i.e., symbol) quadrature amplitude modulation (16-QAM) constellation diagram with prescribed slicing thresholds indicated thereon, according to an embodiment of the invention.

By way of example only, FIG. 4 is a conceptual view depicting an exemplary 16-QAM constellation diagram 400 with prescribed slicing thresholds indicated thereon, according to an embodiment of the invention. Constellation diagram 400 includes a plurality of constellation points 401 representing a set of modulation symbols which comprise a given modulation alphabet A.

As shown in FIG. 4, a received sample y 402 is preferably compared to three thresholds, Thr1 404, Thr2 406 and Thr3 408, on a real axis of constellation diagram 400 and three thresholds, Thr1 410, Thr2 412 and Thr3 414, on an imaginary axis of the constellation diagram. The thresholds are preferably defined as follows:

$$Thr1 = -d$$

$$Thr2 = 0$$

$$Thr3 = d, \quad (15)$$

where d represents a distance between two closest symbols (i.e., adjacent symbols, assuming all symbols are equally spaced from one another) in the constellation. It is to be appreciated that alternative threshold value assignments may be employed, according to other embodiments of the invention.

In order to generate a correct mapping on the constellation diagram 400, the input symbol should be scaled (i.e., equalized) as follows:

$$y' = \frac{y}{h} = \frac{hx+n}{h} = x + \frac{n}{h} \quad (16)$$

This operation is disadvantageous from an implementation perspective, however, since a 1/x operation is known to require substantial computational overhead (e.g., processor cycles). Additionally, one problem with fixed point scaling is that a noise component of the received signal can be undesirably amplified, for example, as in the case of channel fading. Consequently, in order to avoid such an operation and thereby improve performance, it is preferable to scale the slicer thresholds and to perform comparison procedures using the scaled threshold values as follows:

$$Thr1 = -d \cdot h$$

$$Thr2 = 0$$

$$Thr3 = d \cdot h$$

$$\text{Real}(y) < > Thr1 \; \text{Imag}(y) < > Thr1$$

$$\text{Real}(y) < > 0 \; \text{Imag}(y) < > 0$$

$$\text{Real}(y) < > Thr3 \; \text{Imag}(y) < > Thr3, \quad (17)$$

where h is a prescribed scaling factor (e.g., offset).

Rather than obtaining an ML solution by calculating minimum Euclidian distances $\min_{i=0 \ldots K}(\|y - hx_i\|^2)$, $x_i \subset A$, as in a standard approach, a most likely symbol is obtained, in accordance with embodiments of the invention, using a slicing procedure with the following illustrative steps:

scaling one or more slicer thresholds;

performing comparisons of input sample y to the scaled thresholds (e.g., using equation (17) above) and calculating an offset value;

accessing a look-up table, or alternative storage element, with the calculated offsets stored therein and reading the ML symbol and its corresponding index (see FIG. 4).

The obtained symbol—determined to be closest to a received sample (with maximum likelihood)—may be referred to herein as a "winner" symbol. For instance, with reference to FIG. 4, the winner symbol is symbol 416 (symbol 1), which is the symbol closest to received sample 402 in constellation 400. The slicing methodology according to an embodiment of the invention can be efficiently implemented on a processor core (e.g., a 3400e core, commercially available from LSI Corporation, Milpitas, Calif.) which is optimized to handle complex symbols and contains a suitable subset of arithmetic operations with complex numbers.

As previously stated, the slicing methodology according to embodiments of the invention beneficially allows the determination of a best metric without a need for calculating Euclidian distances. This novel approach reduces the number of calculations in intermediate stages of the M-algorithm, required for generating a subset of best candidates (e.g., best symbols and corresponding metrics) for use in a next iteration (second iteration in the case of a two-dimensional problem) of the M-algorithm. The slicing method according to aspects of the invention can be used for any "symmetrical" constellation scheme, including, but not limited to, quadrature phase shift keying (QPSK), 16-QAM, 64-QAM, 256-QAM, etc. An important aspect of the invention is not necessarily in the usage of slicing to determine a one-dimensional solution, but rather in the usage of slicing to determine a subset of $M_a$ best symbols in intermediate stages of the M-algorithm. In the context of 16-QAM, 16 calculations of Euclidian distances are required using the traditional QRD-M approach.

A second computational disadvantage of a traditional implementation of the M-algorithm is the necessity to sort through all the calculated Euclidian distances to obtain best $M_a$ candidates from an entire symbol alphabet. In the following description, reference will again be made to the specific case of a two-dimensional problem, where y' is a 2×1 vector obtained as a result of a QR decomposition of the channel matrix H from the input vector y, as described in equation (4) above. The slicing methodology according to aspects of the invention takes advantage of the fact that the $M_a$ symbols having the best metrics will be those symbols located in close proximity (e.g., adjacent or nearest neighbors) to the winner symbol. Hence, the slicing approach can also be used to define a "winner set"; a set of $M_a$ symbols with best metrics (i.e., minimum Euclidian distances to a given received sample $y_1'$). A method for using slicing to define a winner set comprising $M_a$ closest neighbors to a given received sample $y_1'$ will be described in further detail below, in accordance with another aspect of the invention.

Figure 5:
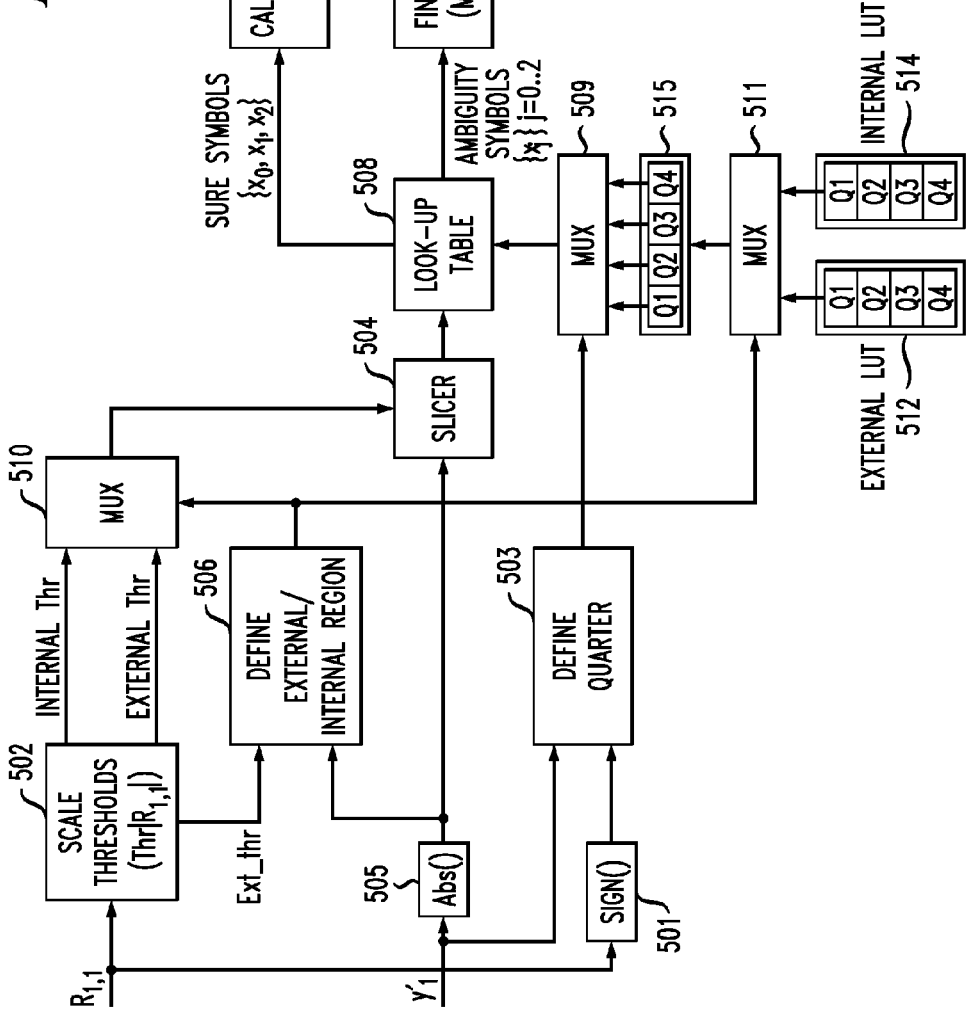
FIG. 5 is a block diagram depicting at least a portion of an exemplary slicing methodology for determining a prescribed number of best candidate symbols in a first iteration of an illustrative 2×2 QRD-M methodology, according to an embodiment of the invention.

FIG. 5 is a block diagram depicting at least a portion of an exemplary slicing methodology 500 for determining a prescribed number of best candidate symbols in a first iteration of an illustrative 2×2 QRD-M methodology, according to an embodiment of the invention. In a context of the illustrative QRD-M algorithm with $M_a=4$, the slicing methodology 500 is preferably used in the first iteration to define a set of best candidates for use in a second iteration of the QRD-M algorithm. Using slicing and a look-up table, methodology 500 obtains a first symbol $y_1'$ in order to find four candidate symbols. As may be used herein, $y_1'$ is intended to refer to a second element of received vector y' after QR decomposition in the case of a 2×2 matrix. If a generic N×N matrix is used, we always start with element $y_{N-1}'$, and at each iteration a modified value $\tilde{y}_{N-k}' = y_{N-k}' - \Sigma_{i=k+1}^{N-1} R(k,i) \cdot \hat{x}_i$ is used, where $\hat{x}$ is one of the $M_a$ best symbols from the previous iteration(s) as input to a slicer block (e.g., 504 of FIG. 5).

With continued reference to FIG. 5, a scaling block 502 is operative to receive, as an input, a given element of the triangular matrix, $R_{1,1}$, which may be generated by a QR decomposition, and to scale one or more thresholds of the slicer as a function of input $R_{1,1}$ to thereby generate, as an output, one or more scaled slicing thresholds, Thrs. $R_{1,1}$ is the second diagonal element of matrix R (obtained after QR decomposition over channel matrix H). In the case of an N×N matrix, we refer to diagonal elements R(N−i,N−i), where i is an integer and is, in fact, an iteration number of the M-algorithm, to be a scaling factor for slicer thresholds in order to determine a corresponding $\hat{x}_{N-i}$ winner symbol. Since the M-algorithm is recursive, in each iteration the dimension of the problem is decremented, running from the last element $x_{N-1}$ to the first element $x_0$.

The scaled slicing thresholds Thrs are supplied, via a first multiplexer 510, to a slicer block 504. As shown in FIG. 5, two sets of thresholds, namely, an internal Thrs and an External Thrs, are generated by scaling block 502 as outputs thereof. Multiplexer 510 selects which of the two sets of thresholds to use based at least in part on a determination of whether a received input sample $y_1'$ resides within a prescribed internal region or a prescribed external region of the symbol constellation (as will be described in further detail below in connection with FIG. 6). An external/internal region definition block 506 is operative to receive the input sample $y_1'$ and a prescribed threshold, Ext_Thr, in order to make such determination as to where in the symbol constellation the input sample $y_1'$ resides. Block 506 is operative to generate a first control signal which is supplied to multiplexer 510 for selecting an appropriate threshold (e.g., Internal Thrs or External Thrs) as a function thereof to be used by slicer block 504.

The first control signal generated by block 506 is also supplied to a second multiplexer 511. Multiplexer 511 is operative to receive, as inputs, a first look-up table (External LUT) 512 and a second look-up table (Internal LUT) 514 and to generate, as an output, entries (e.g., Q1, Q2, Q3, Q4) from an appropriate one of the look-up tables as a function of the first control signal supplied thereto. The entries Q1, Q2, Q3, Q4 in look-up tables 512 and 514 may comprise, for example, prescribed offset values corresponding to each defined quarter (i.e., quadrant) of the symbol constellation. At least one of look-up tables 512 and 514 may be implemented using read-only memory (ROM), although an alternative storage means is similarly contemplated (e.g., nonvolatile register, etc.). In a hardware implementation of the slicing methodology 500, an output of multiplexer 511 may be loaded (e.g., in parallel) into a register 515 or an alternative storage element. Memory selection can also be implemented, for example, by relative offset of a ROM pointer or by if/else instructions within operating code for performing the slicing methodology 500.

Slicing methodology 500 further includes a quarter (quadrant) definition block (Define Quarter) 503. Block 503 is preferably operative to receive as inputs the input sample $y_1'$ and a sign of the given element of the triangular matrix, $R_{1,1}$, which may be obtained from a sign block 501, and to generate as an output a second control signal which is indicative of a defined quarter of the symbol constellation in which the input sample $y_1'$ resides. The second control signal is supplied to a third multiplexer 509 which is operative to select a corresponding quarter offset (e.g., Q1, Q2, Q3, Q4) from register 515 as a function of the second control signal. As previously stated, memory selection can also be implemented, for example, by relative offset of a ROM pointer or by if/else instructions within operating code for performing the slicing methodology 500.

In addition to receiving the scaled slicing thresholds Thrs, slicer block 504 is operative to receive an absolute value of the input sample $y_1'$ from block 505 to perform slicing in order to determine a sector of the symbol constellation in which the input sample resides. Slicer block 504 is operative to generate a third control signal which is indicative of a sector in which the input sample resides. By way of example only and without loss of generality, an internal region of the constellation is preferably divided into nine sectors and an external region of the constellation is divided into five sectors, although the invention is not limited to any specific number and/or configuration of sectors into which the constellation may be arranged. In this manner, block 504 functions essentially as a window comparator using the scaled slicing thresholds Thrs to define boundaries of the sectors. The particular sector number in which the input sample resides, as embodied in the third control signal, is preferably used as an index into a look-up table 508 comprising the subsets of "sure" and "ambiguity" symbols previously discussed and used subsequently by the QRD-M algorithm. Since, the slicer 504 operates with the absolute value of input sample $y_1'$, it selects a winner sector (used as an offset inside a look-up table) from a first quadrant (Q1) of the symbol constellation (as depicted in FIG. 6). But due to the symmetrical form of the constellation and using the selection obtained from block 503, the proper quarter of a given look-up table is chosen to provide a correct subset of sure and ambiguity symbols.

Slicing methodology 500 performs two real axis and two imaginary axis (for a total of four) comparisons in order to define an offset for a look-up table 508. The third control signal generated by slicer block 504 is preferably utilized to define a "winner" sector (i.e., a sector of the symbol constellation in which the input sample is determined to reside). The number of the sector is used as an offset into the look-up table 508, as previously stated.

Slicing methodology 500 accesses look-up table 508 to obtain three sure candidates and three ambiguity candidates as possible candidates for forming the set of $M_a=4$ best candidates. Look-up table 508 preferably comprises sure and ambiguity symbol sets for each defined sector in the symbol constellation. These sure symbols $((\{x_i\}, i=0 \ldots 2))$ and ambiguity symbols $(\{x_j\}, j=0 \ldots 2)$ are subsequently used to form the set of $M_a$ best candidates for a second iteration of the QRD-M algorithm, as previously explained.

The set of sure symbols $((\{x_i\}, i=0 \ldots 2))$ obtained from look-up table 508 is supplied to a metric calculation block 517. Block 517 is operative to calculate a metric for each of the sure symbols as follows:

$$M_1(i) = \|y_1' - r_{11} \cdot \hat{x}_i\|^2, \quad (18)$$

where $i=0, 1, 2$ are indexes of the sure symbols. These metrics are then used for cumulative metric calculation in the second iteration of the QRD-M methodology.

Similarly, the set of ambiguity symbols $(\{x_j\}, j=0 \ldots 2)$ obtained from look-up table 508 is supplied to a best metric (minimum distance) determination block 516. Block 516 selects one candidate from the three ambiguity candidates as a best candidate symbol according to minimum Euclidian distance criteria as follows:

$$\hat{x}_3 = \arg\min\{\|y_1 - r_{11} \cdot x_{j,1}\|^2, \|y_1' - r_{11} \cdot x_{j,2}\|^2, \|y_1' - r_{11} \cdot x_{j,3}\|^2\}, \quad (19)$$

where j is an index of the ambiguity set containing three ambiguity symbols. Using equation (19) above and selecting a best candidate symbol, $\hat{x}_3 = x_{min}$, a corresponding metric $M_1(3) = M_{min}$ is also obtained. The best candidate symbol $x_{min}$ and metric $M_{min}$ are then supplied to block 518, along with metrics corresponding to the set of sure symbols generated by block 517. Block 518 is operative to generate as an output a set of $M_a=4$ best candidate symbols $\{\hat{x}_1(0), \hat{x}_1(1), \hat{x}_1(2), \hat{x}_1(3)\}$ with corresponding metrics $\{M_1(0), M_1(1), M_1(2), M_1(3)\}$ that will be used for a next iteration of the QRD-M methodology.

It is to be understood that each of the functional blocks depicted in FIG. 5 may be implemented in the form of hardware (e.g., a circuit, field programmable gate array (FPGA), etc.), software (e.g., code running on a processor), or a combination of hardware and software adapted to perform the specific function(s) described herein. Moreover, although shown as separate functional blocks, one or more of the blocks may be combined either with one another or with other blocks not explicitly shown in FIG. 5 to form another block which integrates at least a portion of the functionalities of the combined blocks.

FIG. 6 is a constellation diagram 600 illustrating an exemplary methodology for determining whether a given symbol resides within or outside defined regions of the symbol constellation, according to an embodiment of the invention. Constellation diagram 600 is preferably divided into a plurality of zones; in this illustration, four quarters, I, II, III, and IV, are defined. In the example shown, the quarters are sized to be the same relative to one another, and each quarter includes the same number of symbols therein, although the invention is not limited to any specific size or number of zones. More particularly, quarter I includes symbols 0, 1, 4 and 5, and is bounded by real axis 604 and imaginary axis 602. Quarter II includes symbols 8, 9, 12 and 13, and is bounded by real axis 604 and imaginary axis 602. Quarter III includes symbols 2, 3, 6 and 7, and is bounded by real axis 604 and imaginary axis 602. Likewise, quarter IV includes symbols 10, 11, 14 and 15, and is bounded by real axis 604 and imaginary axis 602.

It is well known that in digital communications, the constellation is used to map incoming data bits (e.g., bits $b_0, b_1, b_2$ and $b_3$, in the context of 16-QAM) into complex symbols, which are then transmitted by the communication system. The number of constellation symbols M is equal to $2^N$, where N is the number of data bits. As the constellation becomes more complex, the communication rate generally increases. In 16-QAM, each symbol corresponds to four data bits, and hence there are 16 symbols in the constellation. The two least significant data bits, $b_0 b_1$, are typically mapped to the real axis 604 and the two most significant data bits, $b_2 b_3$, are mapped to the imaginary axis 602 according to the Gray code, as shown in FIG. 6.

In this illustration, thresholds 606, 608, 610 and 612 define boundaries between an internal region 614 and an external region 616 of the symbol constellation. Each of these thresholds 606, 608, 610 and 612 is defined as $ExtThr=2 \cdot d$ from a corresponding real or imaginary axis, where d is a distance between adjacent symbols in the constellation. Thus, first threshold 606 is $2 \cdot d$ on the real axis, second threshold 608 is $2 \cdot d$ on the imaginary axis, third threshold 610 is $-2 \cdot d$ on the real axis, and fourth threshold 612 is $-2 \cdot d$ on the imaginary axis.

Two comparisons are performed in order to determine whether a given input symbol falls within internal region 614 or within external region 616 (i.e., outside of the internal region) in constellation diagram 600. Since the constellation is symmetrical, the two comparisons may be performed on absolute values of input sample $y_1'$ and may be represented as follows:

$$(|Re\{y_1'\}| > ExtThr) \cup (|Im\{y_1'\}| > ExtThr) \quad (20)$$

Depending upon where the input sample $y_1'$ falls within the symbol constellation, there are two different sets of thresholds which can be used by the slicer to calculate offsets for two different look-up tables (external or internal) that contain a subset of three sure symbols and three ambiguity symbols. Minimum Euclidian distance criteria is preferably used to determine a best symbol from a set of ambiguity symbols, as described above in conjunction with equation 12. The obtained subset of $M_a=4$ best candidates is then used in a second iteration of the QRD-M algorithm, as previously explained. A subset slicing methodology according to an embodiment of the invention will be described in further detail below using examples of different symbol ambiguities.

Regardless of whether the input symbol falls within internal region 614 or external region 616 in the constellation diagram 600, it is necessary to define quarter coordinates where the input symbol $y_1'$ falls, for example by subdividing a given quarter into a plurality of internal sectors. Slicer 504 operates with absolute values of input samples $y_1'$ and absolute values of thresholds and, as a result, the winner sector (index in look-up table) is chosen in a first quadrant of the constellation, as depicted in FIG. 7. But since the problem is symmetric, the same index can be used for all four quarters (e.g., quarters I, II, III, or IV) in the constellation diagram 600. The proper quarter of a given one of the look-up tables 512 and 514 is chosen by block 503, according to the result of comparisons (Sign($R_{1,1}$)~Re{$y_1'$}>0) and (Sign($R_{1,1}$)·Im{$y_1'$}>0).

FIG. 7 is a constellation diagram 700 illustrating an exemplary methodology for subdividing a given quarter of an internal region of the symbol constellation, according to an embodiment of the invention. In this exemplary embodiment, quarter I 702 is subdivided into nine internal sectors of differing sizes, labeled 0 through 8. It is to be appreciated that the invention is not limited to any specific number of internal sectors, nor is the invention limited to any particular size of a given sector. The number and sizes of the respective sectors in the symbol constellation are functions of the parameter $M_a$ and the constellation type.

The internal sectors in quarter I 702 are preferably defined by a plurality of thresholds in addition to the real and imaginary axes 604 and 602, respectively. More particularly, sector 0 is defined by real axis 604, imaginary axis 602, a first internal threshold (Thr1) 704 on the real axis and a first internal threshold (Thr1) 708 on the imaginary axis. Sector 1 is defined by real axis 604, threshold 704, threshold 708, and a second internal threshold (Thr2) 706 on the real axis. Sector 2 is defined by real axis 604, threshold 706, threshold 708, and an external threshold (ExtThr) 606 on the real axis. Sector 3 is defined by imaginary axis 602, threshold 704, threshold 708, and a second internal threshold (Thr2) 710 on the imaginary axis. Sector 4 is defined by threshold 704, threshold 706, threshold 708 and threshold 710. Sector 5 is defined by threshold 706, threshold 708, threshold 710, and threshold 606. Sector 6 is defined by imaginary axis 602, threshold 704, threshold 710, and an external threshold (ExtThr) 608 on the imaginary axis. Sector 7 is defined by threshold 704, threshold 706, threshold 710, and threshold 608. Sector 8 is defined by threshold 706, threshold 606, threshold 608, and threshold 710.

In this example, sectors 0, 1, 3 and 4 are referred to as "internal sectors," since one symbol (i.e., symbol 0) is centered at an intersection of the four adjacent internal sectors. Likewise, sector 8 is referred to as a "corner sector," since the symbol therein (i.e., symbol 5) does not reside in any of the sectors adjacent to sector 8. The remaining sectors in the constellation 700 (i.e., sectors 2, 5, 6 and 7) are referred to as "edge sectors," since the respective symbols partially located in these sectors are centered on an edge of two adjacent sectors. Specifically, for example, symbol 1 is centered on an edge between adjacent sectors 6 and 7; symbol 4 is centered on an edge between adjacent sectors 2 and 5.

When the input sample $y_1'$ falls within the internal region (e.g., region 614 in FIG. 6) of the constellation diagram 700, the following expression is satisfied:

$$(|Re\{y_1'\}|<ExtThr) \cap (|Im\{y_1'\}|<ExtThr)$$

Since there are nine internal sectors in quarter I 702, four comparisons are required in order to determine in which sector a given input sample $y_1'$ falls as follows:

$$Re\{y_1'\}>Thr1$$

$$Im\{y_1'\}>Thr1$$

$$Re\{y_1'\}>Thr2$$

$$Im\{y_1'\}>Thr2,$$

where $$Thr_1 = \frac{d}{2} \cdot |r_{1,1}|,$$

$Thr_2 = d \cdot |r_{1,1}|$, and d is the distance between closest (i.e., i.e., adjacent) symbols in the constellation diagram 700. A look-up table offset is calculated as a function of the comparison results for a given input sample $y_1'$. The obtained offset is used as an index to point to one of the nine internal sectors in each quarter. The look-up table contains a subset of candidate symbols for the second iteration of the QRD-M algorithm.

An internal look-up table, which may be implemented in a manner consistent with internal look-up table 514 shown in FIG. 5, preferably comprises indexes of sure and ambiguity symbols for each of the nine sectors in an internal region of the symbol constellation, as indicated in the exemplary table 1 below. Table 1 corresponds to quarter I in the constellation but can be easily modified by one skilled in the art given the teachings herein to generate similar tables corresponding to remaining quarters II, III and IV.

TABLE 1

| Sector | sym1 winner | Sure indexes sym2 | sym3 | Ambiguity indexes sym1 | sym2 | sym3 | Sure symbols sym1 | sym2 | sym3 | Ambiguity symbols sym1 | sym2 | sym3 |
|---|---|---|---|---|---|---|---|---|---|---|---|---|
| 0 | 0 | 2 | 8 | 1 | 10 | 4 | S0 | S2 | S8 | S1 | S10 | S4 |
| 1 | 0 | 2 | 4 | 1 | 6 | 8 | S0 | S2 | S4 | S1 | S6 | S8 |
| 2 | 4 | 6 | 0 | 5 | 2 | NO | S4 | S6 | S0 | S5 | S2 | NO |
| 3 | 0 | 8 | 1 | 2 | 9 | 4 | S0 | S8 | S1 | S2 | S9 | S4 |
| 4 | 0 | 4 | 1 | 2 | 5 | 8 | S0 | S4 | S1 | S2 | S5 | S8 |
| 5 | 4 | 5 | 0 | 6 | 1 | NO | S4 | S5 | S0 | S6 | S1 | NO |
| 6 | 1 | 9 | 0 | 5 | 8 | NO | S1 | S9 | S0 | S5 | S8 | NO |
| 7 | 1 | 5 | 0 | 9 | 4 | NO | S1 | S5 | S0 | S9 | S4 | NO |
| 8 | 5 | 1 | 4 | NO | NO | NO | S5 | S1 | S4 | NO | NO | NO |

Similarly, an external look-up table, which may be implemented in a manner consistent with external look-up table 512 shown in FIG. 5, preferably comprises indexes of sure and ambiguity symbols for each of the five sectors in an external region of the symbol constellation, as indicated in the exemplary table 2 below. Table 2 corresponds to quarter I in the symbol constellation but can be easily modified by one skilled in the art given the teachings herein to generate similar tables corresponding to quarters II, III and IV.

TABLE 2

| | Sure indexes | | | Ambiguity indexes | | | Sure symbols | | | Ambiguity symbols | | |
|---|---|---|---|---|---|---|---|---|---|---|---|---|
| Sector | sym1 winner | sym2 | sym3 | sym1 | sym2 | sym3 | sym1 | sym2 | sym3 | sym1 | sym2 | sym3 |
| 0 | 5 | 1 | 4 | 0 | 6 | 9 | S5 | S1 | S4 | S0 | S6 | S9 |
| 1 | 4 | 6 | 5 | 2 | 0 | 7 | S4 | S6 | S5 | S2 | S0 | S7 |
| 2 | 4 | 6 | 5 | 1 | 0 | 7 | S4 | S6 | S5 | S1 | S0 | S7 |
| 3 | 1 | 9 | 5 | 8 | 0 | 13 | S1 | S9 | S5 | S8 | S0 | S13 |
| 4 | 1 | 9 | 5 | 4 | 0 | 13 | S1 | S9 | S1 | S4 | S0 | S13 |

Figure 8:
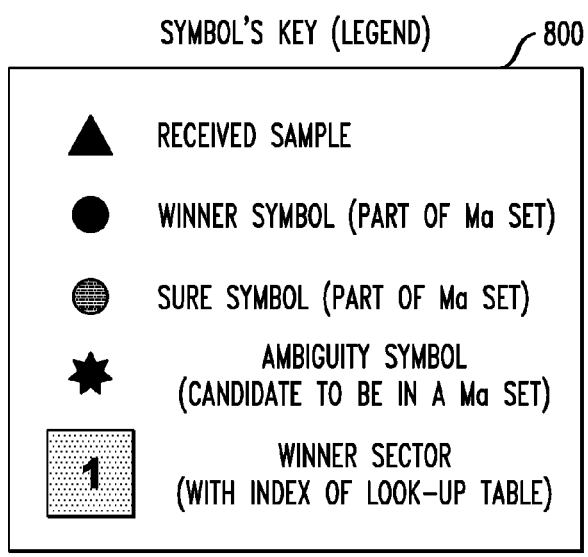
FIG. 8 is a symbol legend which may be used when referring to the figures to provide a better understanding thereof.

A methodology in accordance with an aspect of the invention for determining ambiguity candidates corresponding to a received input sample $y_n'$, that is an element of a received input vector y', when the input sample falls within an internal region (e.g., region 614 in FIG. 6) of the constellation diagram will now be described in further detail. FIGS. 9 through 17 are constellation diagrams illustrating an exemplary methodology for determining a set of ambiguity candidates corresponding to a given input sample, according to an embodiment of the invention. FIG. 8 is a legend 800 which may be used when referring to the figures to provide a better understanding thereof.

With reference again to FIG. 7, each sector preferably has three sure symbols (i.e., the winner symbol and its two closest neighbors) and three ambiguity symbols. In formulating the subset of $M_a=4$ best candidate symbols corresponding to a given input sample for use in a second iteration of the QRD-M algorithm, the following steps are preferably performed (see FIG. 5):

the three sure symbols are selected directly from a look-up table; and the fourth symbol is selected according to minimal Euclidian distance criteria (see equation (19) above) from three ambiguity candidates, as will be illustrated in FIGS. 9 through 17.

By way of example only and without limitation, consider three different locations of a winner symbol (i.e., a symbol in the constellation that is closest to an input sample): a corner sector, an edge sector, and an internal sector.

Figure 9:
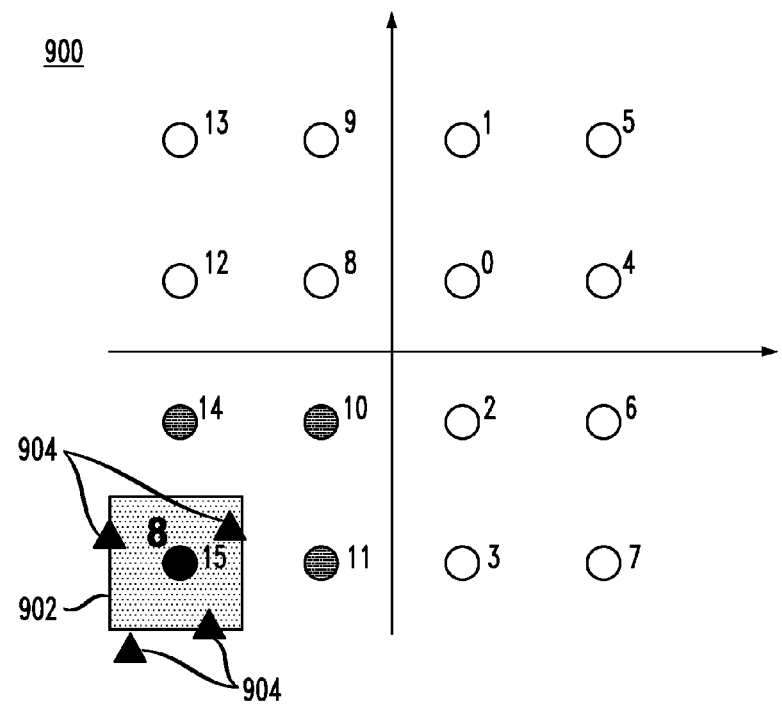
FIG. 9 is a symbol constellation diagram conceptually illustrating an exemplary scenario in which a winner symbol (i.e., a symbol in the constellation that is determined to be closest to a received sample) is located in a corner sector of a given quarter in an internal region of the constellation diagram, according to an embodiment of the invention.

FIG. 9 is a constellation diagram 900 depicting an exemplary scenario in which a winner symbol is located in a corner sector (sector 8) 902 of quarter IV (see FIG. 7) in the constellation diagram, according to an embodiment of the invention. In this illustrative case, received samples 904 all fall in close proximity to symbol 15 in sector 902. In this scenario, there are no ambiguity symbols, and therefore the look-up table will include only sure candidates; namely, a winner symbol (symbol 15) and its three nearest neighbors (symbols 10, 11 and 14).

FIGS. 10 through 13 illustrate scenarios in which input samples fall within an edge sector of the constellation diagram, according to embodiments of the invention. In such scenarios, the look-up table will include three sure candidates (i.e., the winner symbol and its two closest neighbors) and the last candidate is selected from among two ambiguity symbols.

Figure 10:
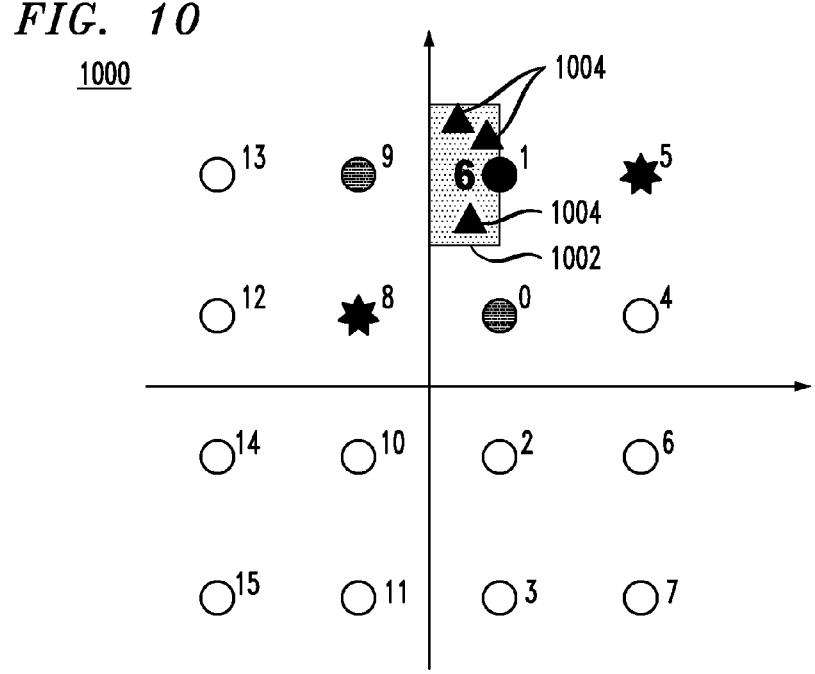
FIGS. 10-13 are symbol constellation diagrams conceptually illustrating exemplary scenarios in which a winner symbol is located in respective edge sectors of an internal region of the constellation diagrams, according to embodiments of the invention.

Specifically, FIG. 10 is a 16-QAM constellation diagram 1000 depicting an exemplary scenario in which a winner symbol is located in an edge sector (sector 6) 1002 of quarter I (see FIG. 7) in the constellation diagram, according to an embodiment of the invention. In this illustrative case, received samples 1004 fall in sector 1002 in close proximity to symbol 1, making symbol 1 a winner symbol. In this scenario, however, the look-up table will include three sure candidates (i.e., the winner symbol 1 and its two closest neighbors, symbols 0 and 9, in constellation diagram 1000) and the last candidate is selected from among two ambiguity symbols (i.e., symbols 5 and 8 in the constellation diagram).

Figure 11:
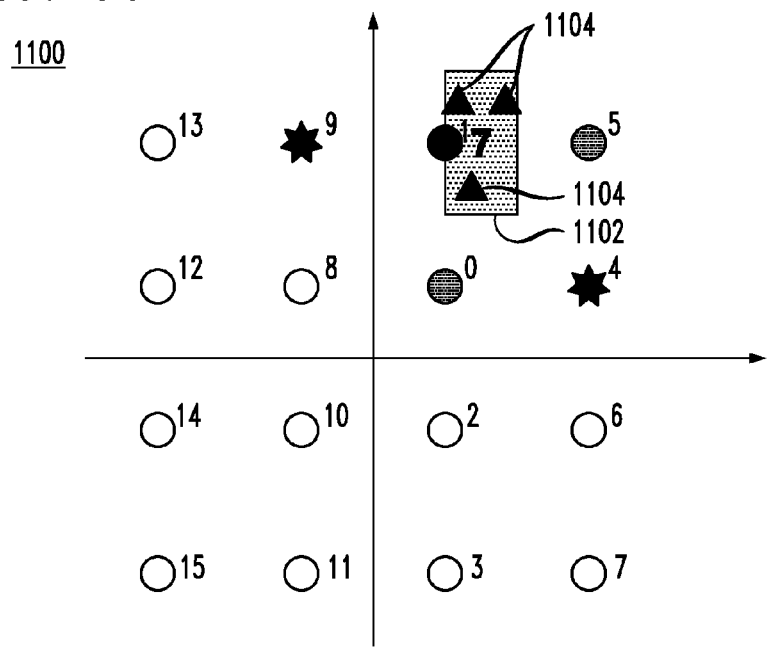

FIG. 11 is a constellation diagram 1100 depicting an exemplary scenario in which a winner symbol is located in an edge sector (sector 7) 1102 of quarter I (see FIG. 7) in the constellation diagram, according to an embodiment of the invention. In this illustrative case, received samples 1104 fall in sector 1102 in close proximity to symbol 1, again making symbol 1 a winner symbol. In this scenario, the look-up table will include three sure candidates (i.e., the winner symbol 1 and its two closest neighbors, symbols 0 and 5, in constellation diagram 1100) and the last candidate is selected from among two ambiguity symbols (i.e., symbols 4 and 9 in the constellation diagram).

Figure 12:
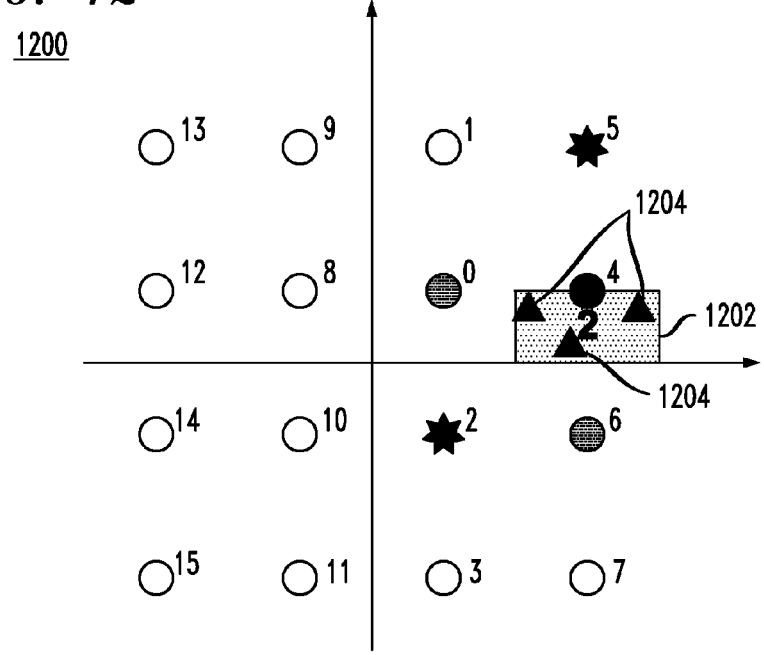

FIG. 12 is a constellation diagram 1200 depicting an exemplary scenario in which a winner symbol is located in an edge sector (sector 2) 1202 of quarter I (see FIG. 7) in the constellation diagram, according to an embodiment of the invention. In this illustrative case, received samples 1204 fall in sector 1202 in close proximity to symbol 4, making symbol 4 a winner symbol. In this scenario, the look-up table will include three sure candidates (i.e., the winner symbol 4 and its two closest neighbors, symbols 0 and 6, in constellation diagram 1200) and the last candidate is selected from among two ambiguity symbols (i.e., symbols 2 and 5 in the constellation diagram).

Figure 13:
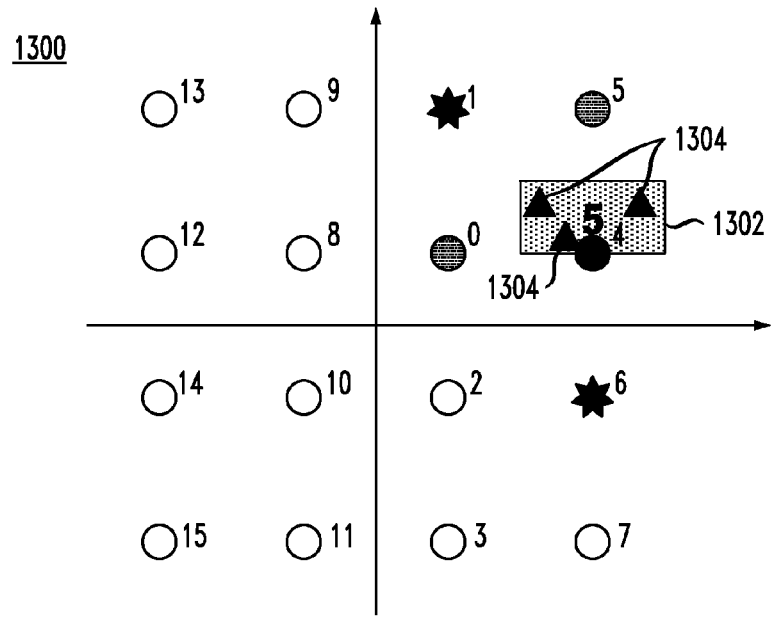

Likewise, FIG. 13 is a constellation diagram 1300 depicting an exemplary scenario in which a winner symbol is located in an edge sector (sector 5) 1302 of quarter I (see FIG. 7) in the constellation diagram, according to an embodiment of the invention. In this illustrative case, received samples 1304 fall in sector 1302 in close proximity to symbol 4, making symbol 4 a winner symbol. In this scenario, the look-up table will include three sure candidates (i.e., the winner symbol 4 and its two closest neighbors, symbols 0 and 5, in constellation diagram 1300) and the last candidate is selected from among two ambiguity symbols (i.e., symbols 1 and 6 in the constellation diagram).

FIGS. 14 through 17 illustrate scenarios in which the input samples fall within an internal sector of the constellation diagram, according to embodiments of the invention. In such scenarios, the look-up table will include three sure candidates (i.e., the winner symbol and its two closest neighbors) and the last candidate is selected from among three ambiguity symbols.

Figure 14:
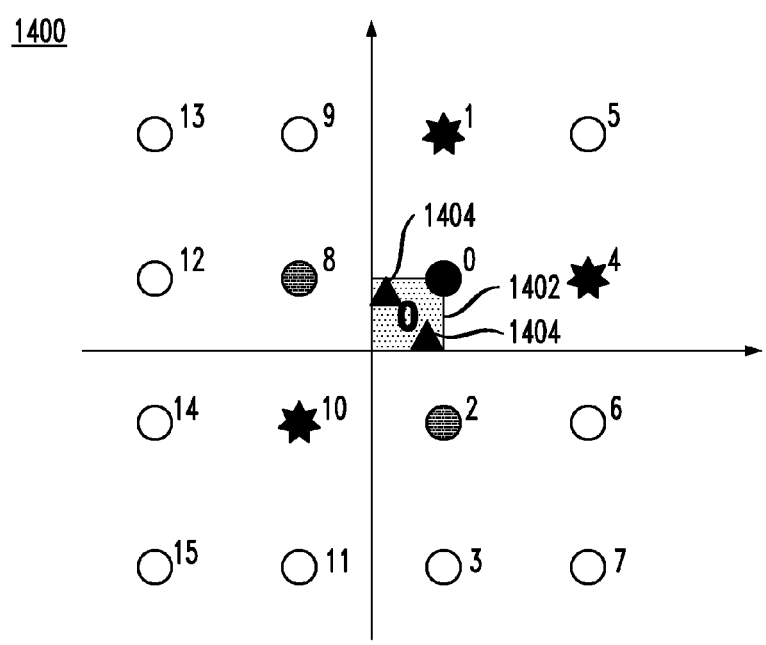
FIGS. 14-17 are symbol constellation diagrams conceptually illustrating exemplary scenarios in which a winner symbol is located in respective internal sectors of an internal region of the constellation diagram, according to embodiments of the invention.

Specifically, FIG. 14 is a constellation diagram 1400 depicting an exemplary scenario in which a winner symbol is located in an internal sector (sector 0) 1402 of quarter I (see FIG. 7) in the constellation diagram, according to an embodiment of the invention. In this illustrative case, received samples 1404 fall in sector 1402 in close proximity to symbol 0, making symbol 0 a winner symbol. In this scenario, the look-up table will include three sure candidates (i.e., the winner symbol 0 and its two closest neighbors, symbols 2 and 8, in constellation diagram 1400) and the last candidate is selected from among three ambiguity symbols (i.e., symbols 1, 4 and 10 in the constellation diagram).

Figure 15:
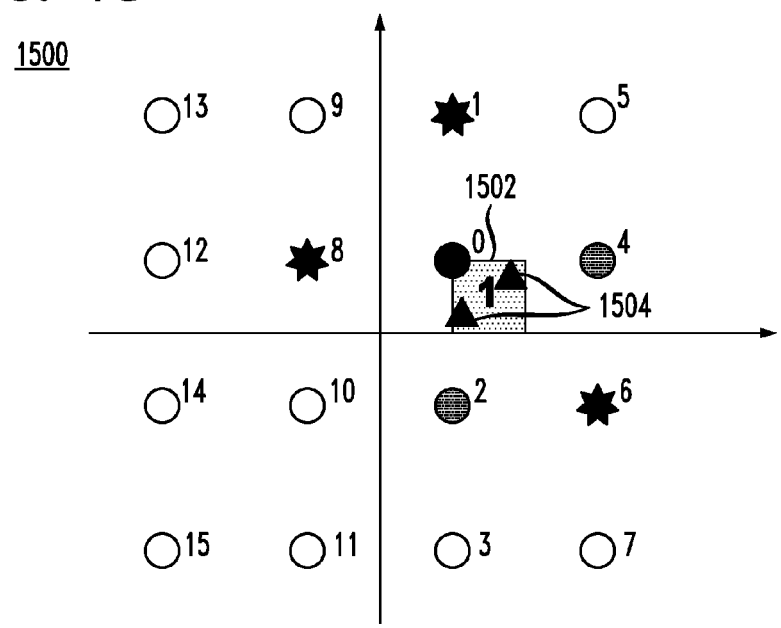

FIG. 15 is a constellation diagram 1500 depicting an exemplary scenario in which a winner symbol is located in an internal sector (sector 1) 1502 of quarter I (see FIG. 7) in the constellation diagram, according to an embodiment of the invention. In this illustrative case, received samples 1504 fall in sector 1502 in close proximity to symbol 0, again making symbol 0 a winner symbol. In this scenario, the look-up table will include three sure candidates (i.e., the winner symbol 0 and its two closest neighbors, symbols 2 and 4, in constellation diagram 1500) and the last candidate is selected from among three ambiguity symbols (i.e., symbols 1, 6 and 8 in the constellation diagram).

Figure 16:
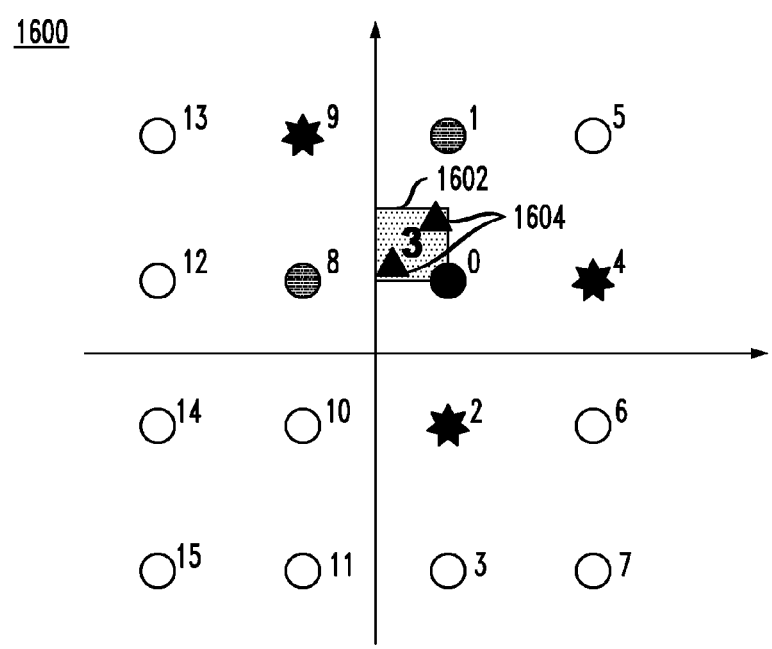

FIG. 16 is a constellation diagram 1600 depicting an exemplary scenario in which a winner symbol is located in an internal sector (sector 3) 1602 of quarter I (see FIG. 7) in the constellation diagram, according to an embodiment of the invention. In this illustrative case, received samples 1604 fall in sector 1602 in close proximity to symbol 0, making symbol 0 a winner symbol. In this scenario, the look-up table will include three sure candidates (i.e., the winner symbol 0 and its two closest neighbors, symbols 1 and 8, in constellation diagram 1600) and the last candidate is selected from among three ambiguity symbols (i.e., symbols 2, 4 and 9 in the constellation diagram).

Figure 17:
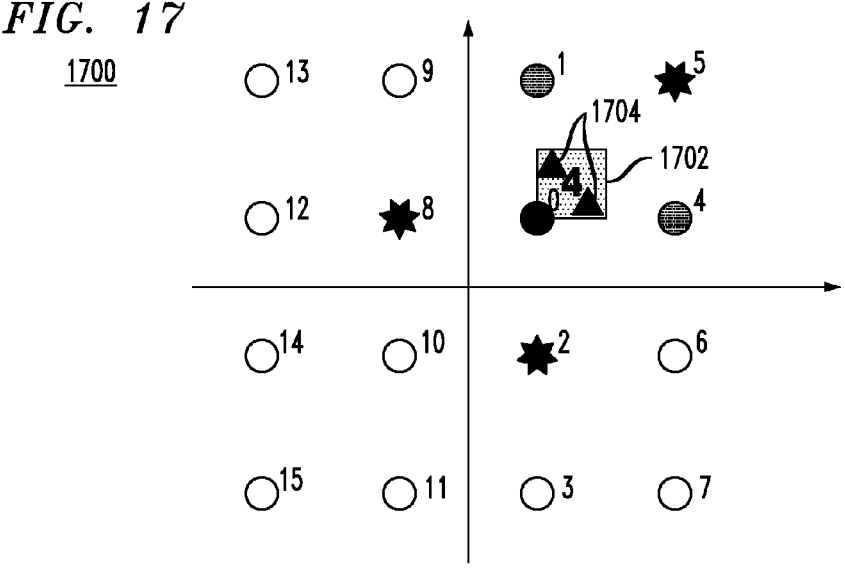

FIG. 17 is a constellation diagram 1700 depicting an exemplary scenario in which a winner symbol is located in an internal sector (sector 4) 1702 of quarter I (see FIG. 7) in the constellation diagram, according to an embodiment of the invention. In this illustrative case, received samples 1704 fall in sector 1702 in close proximity to symbol 0, making symbol 0 a winner symbol. In this scenario, the look-up table will include three sure candidates (i.e., the winner symbol 0 and its two closest neighbors, symbols 1 and 4, in constellation diagram 1700) and the last candidate is selected from among three ambiguity symbols (i.e., symbols 2, 5 and 8 in the constellation diagram).

Next, consider an illustrative case in which one or more received input samples fall within an external region (e.g., region 616 in FIG. 6) of the constellation diagram. This case may be represented by the expression:

$$(|Re\{y_1'\}|>ExtThr) \cup (|Im\{y_1'\}|>ExtThr)$$

Figure 18:
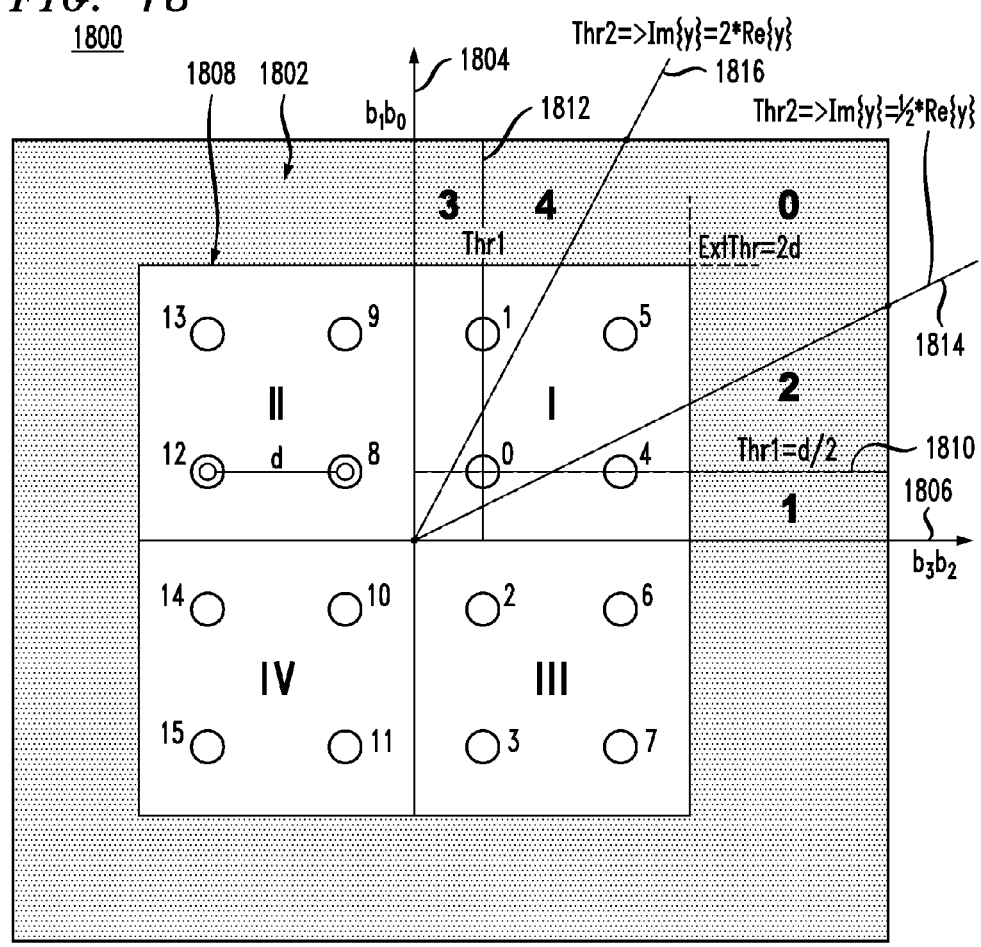
FIG. 18 is a symbol constellation diagram conceptually illustrating an exemplary methodology for subdividing an external region of the symbol constellation, according to an embodiment of the invention.

FIG. 18 is a constellation diagram 1800 illustrating an exemplary methodology for subdividing an external region 1802 of the symbol constellation, according to an embodiment of the invention. The real and imaginary axes 1806 and 1804, respectively, are used to divide the external region 1802 into four quarters, I, II, III and IV, with each quarter being subdivided into five sectors, 0 through 4. As mentioned previously, slicer 504 operates with absolute values of input samples and absolute values of thresholds and, as a result, the winner sector (index in look-up table) is chosen in a first quadrant of the symbol constellation, as depicted in FIG. 18. However, the remaining quarters are subdivided in a similar manner and the same index is used for all four quarters (e.g., quarters I, II, III, or IV), while the proper quarter detection is performed by block 503, based on where the input sample resides. It is to be appreciated that the invention is not limited to any specific number of sectors, nor is the invention limited to any specific size of a given sector.

As apparent from FIG. 18, some of the thresholds (e.g., Thr1 on the real axis and Thr1 on the imaginary axis, where Thr1 is equal to half the distance d between adjacent symbols in the constellation, scaled according to the absolute value of R(1,1)) used to subdivide an internal region 1808 of the constellation diagram 1800 may be extended into external region 1802 and used to subdivide the sectors in a given quarter of the external region. More particularly, sector 1 is preferably defined by the real axis 1806 and by threshold Thr1 1810 on the imaginary axis. Sector 2 is preferably defined by threshold Thr1 1810 and by a threshold, Thr2 1814, projected outwardly into the external region 1802 from an intersection between the imaginary axis 1804 and real axis 1806. Sector 0 is preferably bounded by two lines, namely, 1814 and 1816, as follows:

$$(Im\{y_1'\} < 2 \cdot Re\{y_1'\}) \cap \left(Im\{y_1'\} > \frac{1}{2} \cdot Re\{y_1'\}\right),$$

and refers to external region 1802. As used herein, Re{ } and Im{ } refer to real and imaginary operators, respectively, over the input sample $y_1'$. Thr2 1814 is a line that defines where $Im\{y_1'\}=\frac{1}{2} \cdot Re\{y_1'\}$. Similarly, Thr2 1816 is a line that defines where $Im\{y_1'\}=2 \cdot Re\{y_1'\}$. Sector 4 is preferably defined by threshold Thr2 1816 and by threshold Thr1 1812 on the real axis. Sector 3 is preferably defined by threshold Thr1 1812 and by the imaginary axis 1804.

In order to determine which sector a given input sample $y_1'$ falls within, four comparisons are performed as follows:

$$(Im\{y_1'\} < 2 \cdot Re\{y_1'\}) \cap \left(Im\{y_1'\} > \frac{1}{2} \cdot Re\{y_1'\}\right)$$

is used to define sector 0 or not;
if the first comparison is false (i.e., $y_1'$ falls outside of sector 0) and $(Im\{y_1'\}>Re\{y_1'\})$, then $(Re\{y_1'\}>Thr1)$ is used to define either sector 4 or 3;
if the first comparison is false and $(Im\{y_1'\}<Re\{y_1'\})$, then $(Im\{y_1'\}>Thr1$ is used to define either sector 2 or 1.

In a manner similar to determining ambiguity symbols in the internal region 1808 of the constellation diagram 1800 (e.g., described above in conjunction with FIGS. 9 through 17), each sector preferably includes three sure candidates (i.e., a winner symbol and its two closest neighbors) and a fourth candidate selected from a set of three ambiguity symbols according to minimum Euclidian distance criteria. In accordance with one aspect of the invention, with reference to FIGS. 19 through 23, three different types of possible sector locations for input samples can be defined, each type characterized by a different subset of ambiguity symbols; namely, a corner sector (sector 0) and other sectors (sectors 1-4).

Figure 19:
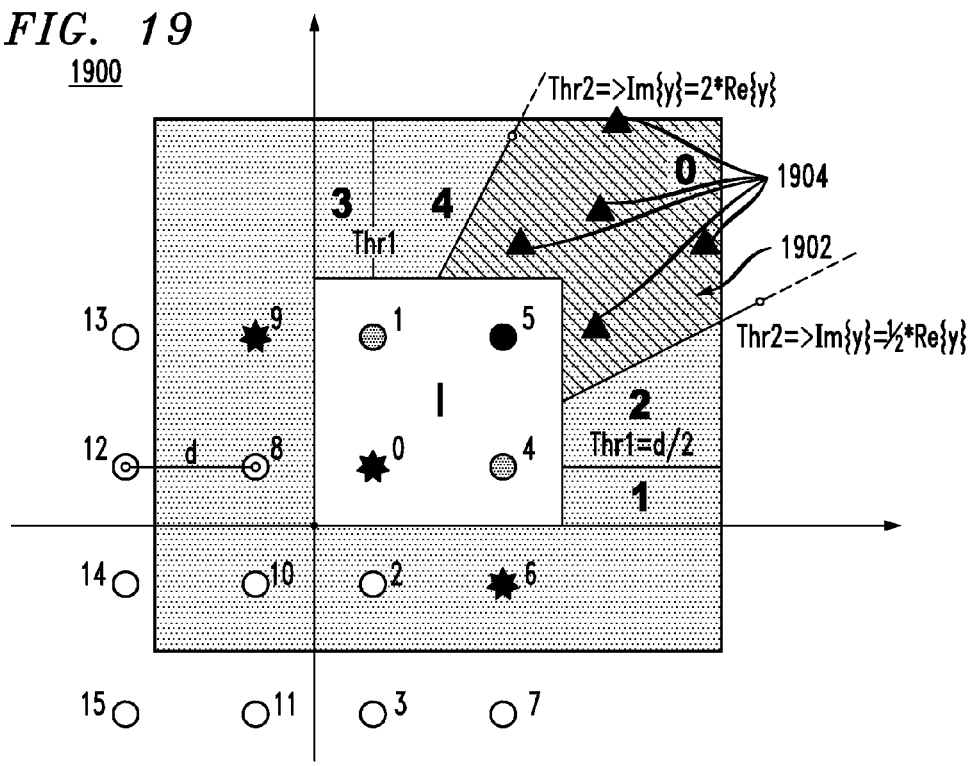
FIG. 19 is a constellation diagram conceptually illustrating an exemplary scenario in which a winner symbol is located in a corner sector of a given quarter in an external region of the constellation diagram, according to an embodiment of the invention.

By way of example only and without loss of generality, FIG. 19 is a constellation diagram 1900 conceptually illustrating an exemplary scenario in which a winner symbol is located in a corner sector 1902 (sector 0) of a given quarter (quarter I) in an external region of the constellation diagram, according to an embodiment of the invention. In this illustrative case, received samples 1904 all fall in close proximity to symbol 5 in the constellation diagram 1900, making symbol 5 a winner symbol. In this scenario, the look-up table will include three sure candidates (i.e., the winner symbol 5 and its two closest neighbors, symbols 1 and 4, in constellation diagram 1900) and a fourth candidate selected from a subset of three ambiguity symbols (i.e., symbols 0, 6 and 9 in the constellation diagram).

Figure 20:
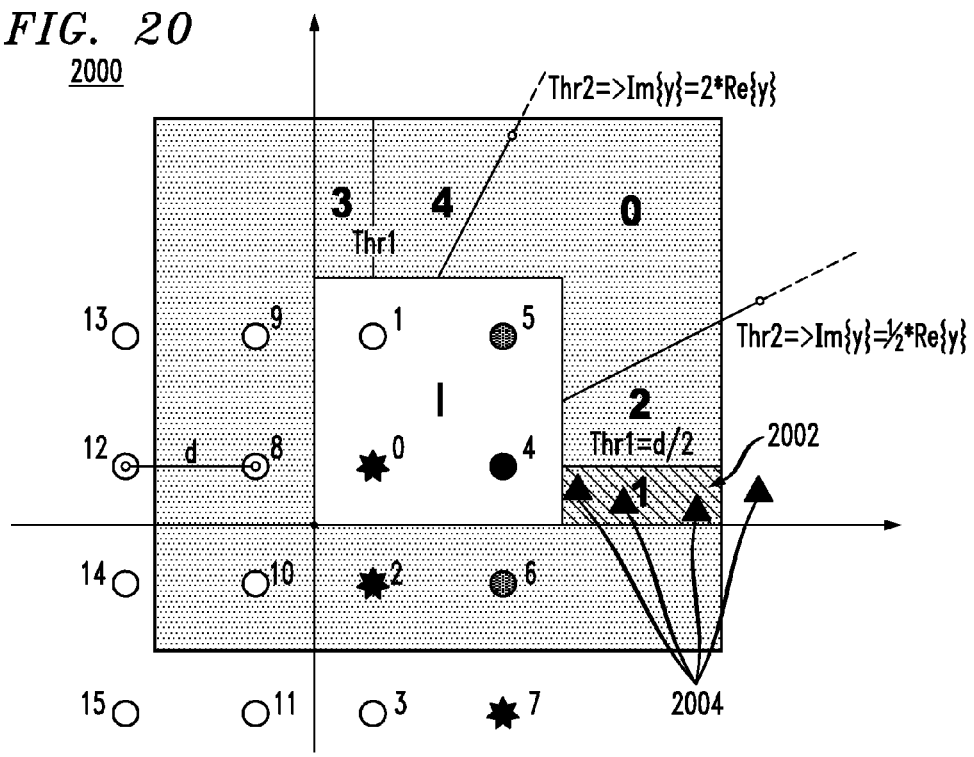
FIGS. 20-23 are symbol constellation diagrams conceptually illustrating exemplary scenarios in which a winner symbol is located in sectors other than a corner sector in an external region of the constellation diagrams, according to embodiments of the invention.

FIG. 20 is a constellation diagram 2000 conceptually illustrating an exemplary scenario in which a winner symbol is located in an odd sector 2002 (sector 1) other than the corner sector (e.g., sector 0) of quarter I in the external region of the constellation diagram, according to an embodiment of the invention. In this illustrative case, received samples 2004 fall in close proximity to symbol 4 in sector 2002, making symbol 4 a winner symbol. In this scenario, the look-up table will include three sure candidates (i.e., the winner symbol 4 and its two closest neighbors, symbols 5 and 6, in constellation diagram 2000) and a fourth candidate selected from a subset of three ambiguity symbols (i.e., symbols 0, 2 and 7 in the constellation diagram).

Figure 21:
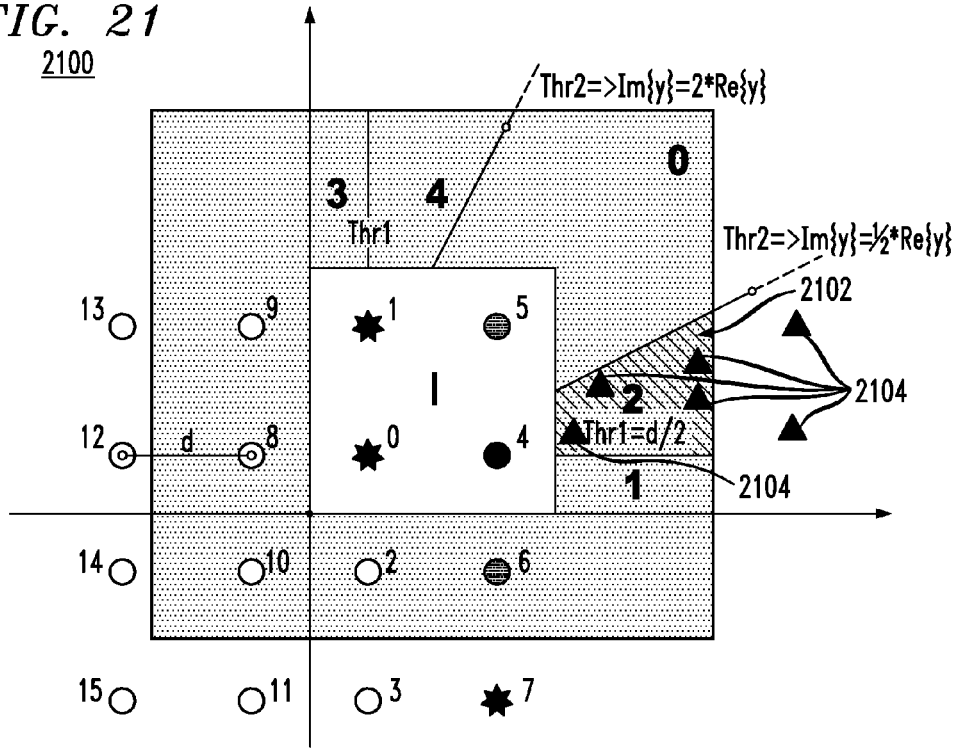

FIG. 21 is a constellation diagram 2100 conceptually illustrating an exemplary scenario in which a winner symbol is located in an even sector 2102 (sector 2) other than the corner sector (e.g., sector 0) of quarter I in the external region of the constellation diagram, according to an embodiment of the invention. In this illustrative case, received samples 2104 fall in close proximity to symbol 4 in sector 2102, again making symbol 4 a winner symbol. In this scenario, the look-up table will include three sure candidates (i.e., the winner symbol 4 and its two closest neighbors, symbols 5 and 6, in constellation diagram 2100) and a fourth candidate selected from a subset of three ambiguity symbols (i.e., symbols 0, 1 and 7 in the constellation diagram).

Figure 22:
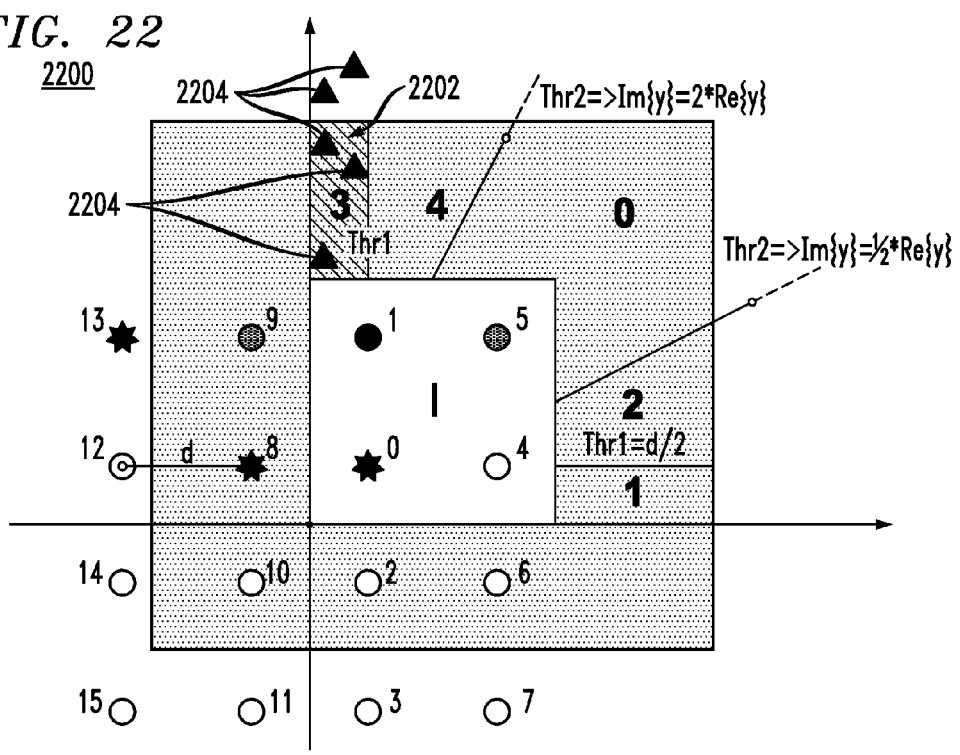

FIG. 22 is a constellation diagram 2200 conceptually illustrating an exemplary scenario in which a winner symbol is located in another odd sector 2202 (sector 3) other than the corner sector (e.g., sector 0) of quarter I in the external region of the constellation diagram, according to an embodiment of the invention. In this illustrative case, received samples 2204 fall in close proximity to symbol 1 in sector 2202, making symbol 1 a winner symbol. In this scenario, the look-up table will include three sure candidates (i.e., the winner symbol 1 and its two closest neighbors, symbols 5 and 9, in constellation diagram 2200) and a fourth candidate selected from a subset of three ambiguity symbols (i.e., symbols 0, 8 and 13 in the constellation diagram).

Figure 23:
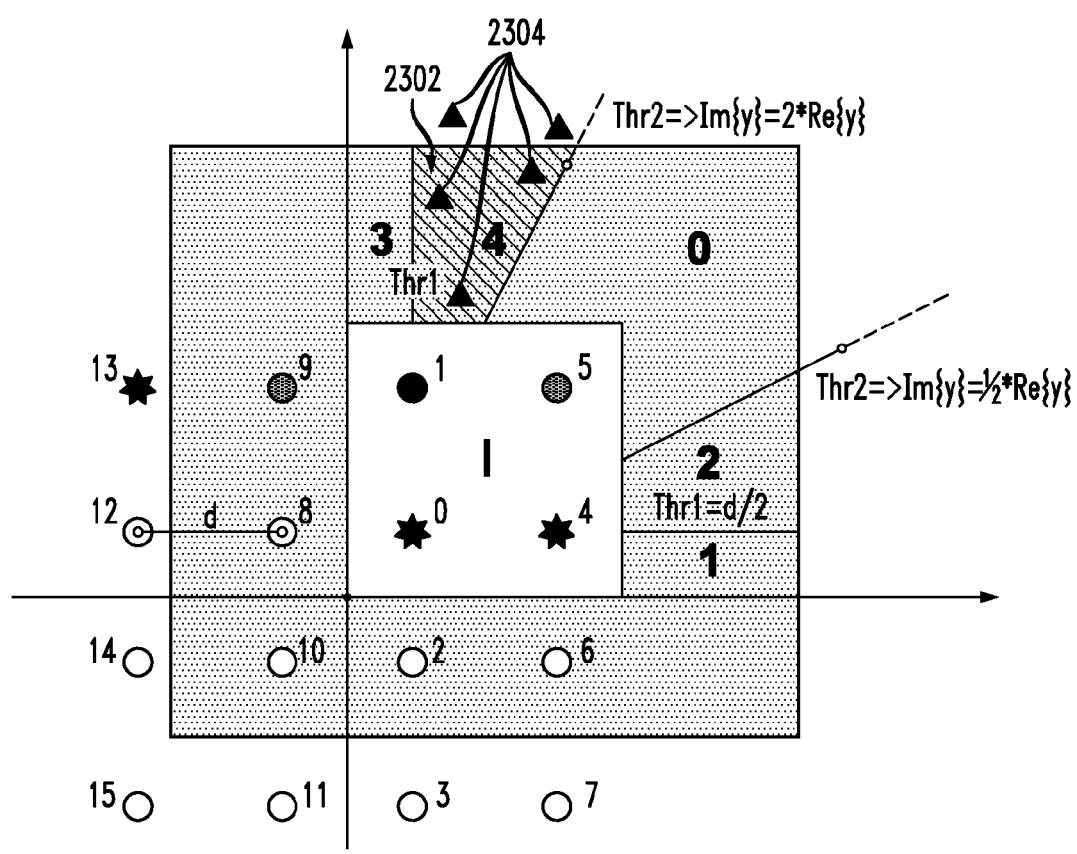

FIG. 23 is a constellation diagram 2300 conceptually illustrating an exemplary scenario in which a winner symbol is located in another even sector 2302 (sector 4) other than the corner sector (e.g., sector 0) of quarter I in the external region of the constellation diagram, according to an embodiment of the invention. In this illustrative case, received samples 2304 fall in close proximity to symbol 1 in sector 2302, again making symbol 1 a winner symbol. In this scenario, the look-up table will include three sure candidates (i.e., the winner symbol 1 and its two closest neighbors, symbols 5 and 9, in constellation diagram 2300) and a fourth candidate selected from a subset of three ambiguity symbols (i.e., symbols 0, 4 and 13 in the constellation diagram).

Figure 24:
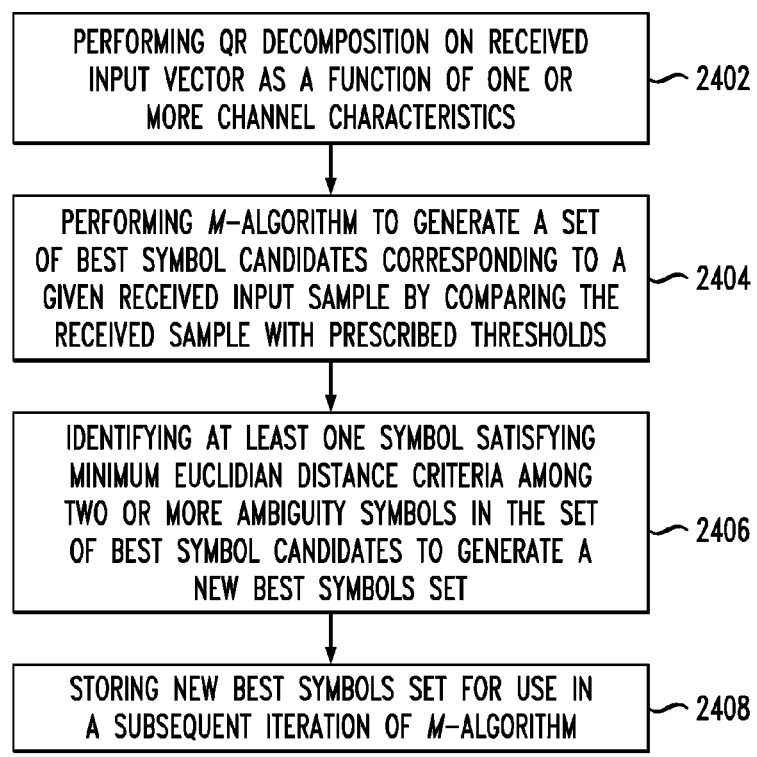
FIG. 24 is a block diagram depicting steps in at least a portion of an exemplary QRD-M methodology, according to an embodiment of the invention.

FIG. 24 is a block diagram depicting at least a portion of an exemplary method for efficiently performing a QRD-M methodology 2400, according to an embodiment of the invention. As apparent from the figure, step 2402 is operative to perform a QR decomposition on a received input vector (e.g., input y shown in FIG. 3) as a function of one or more channel characteristics (e.g., channel matrix H shown in FIG. 3). As a result of the QR decomposition, an upper triangular matrix, R, and a set of received symbols y' are generated based on the received signal vector y.

In step 2404, an M-algorithm is performed to generate a set of best symbol candidates corresponding to a given received input sample (e.g., an input vector element). In the illustrative case where $M_a=4$, the set of best symbol candidates comprises three "sure" symbols (i.e., a winner symbol, determined to be closest to the received sample, and its two closest neighbor symbols) and two or more ambiguity symbols from which a fourth best symbol candidate will be selected. Rather than calculating minimum Euclidian distances between the input sample and each of the symbols in the constellation, however, the received sample is compared to prescribed thresholds, as previously described. In this manner, computational complexity is significantly reduced.

Methodology 2400, in step 2406, is further operative to identify a symbol satisfying minimum Euclidian distance criteria among the two or more ambiguity symbols in the set of best symbol candidates. The identified symbol is then combined with the sure symbols to form a set of best symbols. This set of best symbols is then stored, for example, in a look-up table or alternative storage element, in step 2408 for use in a subsequent iteration of the QRD-M methodology 2400.

Figure 25:
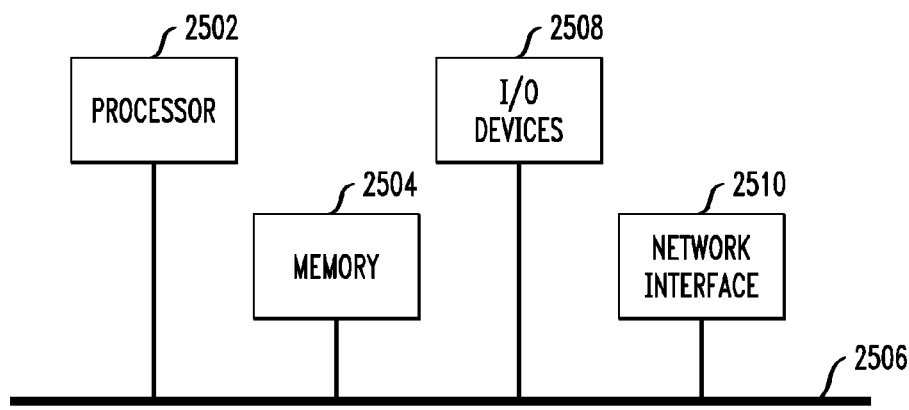
FIG. 25 is a block diagram depicting at least a portion of an exemplary processing system in which aspects of the present invention can be implemented, according to an embodiment of the invention.

Methodologies of embodiments of the present invention may be particularly well-suited for implementation in an electronic device or alternative system, such as, for example, a microprocessor or other processing device/system. By way of illustration only, FIG. 25 is a block diagram depicting at least a portion of an exemplary data processing system 2500, formed in accordance with an aspect of the invention. System 2500 may represent, for example, a general purpose computer or other computing device or systems of computing devices. System 2500 may include a processor 2502, memory 2504 coupled to the processor, as well as input/output (I/O) devices 2508 operative to interface with the processor. The processor 2502, memory 2504, and I/O devices 2508 can be interconnected, for example, via a bus 2506, or alternative connection means, as part of data processing system 2500. Suitable interconnections, for example via the bus, can also be provided to a network interface 2510, such as a network interface card (NIC), which can be provided to interface with a computer or Internet Protocol (IP) network, and to a media interface, such as a diskette or CD-ROM drive, which can be provided to interface with media. The processor 2502 may be configured to perform at least a portion of the methodologies of the present invention described herein above.

It is to be appreciated that the term "processor" as used herein is intended to include any processing device, such as, for example, one that includes a central processing unit (CPU) and/or other processing circuitry (e.g., network processor, DSP, microprocessor, etc.). Additionally, it is to be understood that the term "processor" may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O devices" as used herein is intended to include, for example, one or more input circuits and/or devices (e.g., keyboard, mouse, etc.) for entering data to the processor, one or more output circuits and/or devices (e.g., printer, monitor, etc.) for presenting the results associated with the processor, and/or interface circuitry for operatively coupling the input or output device(s) to the processor.

Accordingly, an application program, or software components thereof, including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the processor 2502. In any case, it is to be appreciated that at least a portion of the components shown in any of FIGS. 1, 3, 5 and 25 may be implemented in various forms of hardware, software, or combinations thereof, e.g., one or more DSPs with associated memory, application-specific integrated circuit(s), functional circuitry, one or more operatively programmed general purpose digital computers with associated memory, etc. Given the teachings of the invention provided herein, one of ordinary skill in the art will be able to contemplate other implementations of the components of the invention.

At least a portion of the techniques of the present invention may be implemented in one or more integrated circuits. In forming integrated circuits, die are typically fabricated in a repeated pattern on a surface of a semiconductor wafer. Each of the die includes a memory described herein, and may include other structures or circuits. Individual die are cut or diced from the wafer, then packaged as integrated circuits. One skilled in the art would know how to dice wafers and package die to produce integrated circuits. Integrated circuits so manufactured are considered part of this invention.

An IC in accordance with embodiments of the present invention can be employed in any application and/or electronic system which is adapted for efficiently detecting data in a wireless communication system in a manner which reduces computational complexity without compromising performance. Suitable systems for implementing embodiments of the invention may include, but are not limited to, communication transceivers (e.g., OFDM transceivers), personal computers, portable computing devices, multimedia processing devices, wireless networking equipment, etc. Systems incorporating such integrated circuits are considered part of this invention. Given the teachings of the invention provided herein, one of ordinary skill in the art will be able to contemplate other implementations and applications of the techniques of the invention.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A method of detecting received data in a communication system comprising a processor, the method comprising the steps of:
    performing, by the processor, a QR decomposition on a received input vector as a function of one or more characteristics of a communication channel over which the input vector was transmitted;
    generating, by the processor, a subset of best symbol candidates including a plurality of sure symbols and a plurality of ambiguity symbols from a symbol constellation by comparing an input sample with one or more prescribed thresholds, the input sample corresponding to an element of the received input vector after QR decomposition;
    identifying, by the processor, at least one symbol satisfying prescribed minimum Euclidian distance criteria among the plurality of ambiguity symbols in the subset of best symbol candidates; and
    generating, by the processor, a subset of best symbols, the subset of best symbols including a prescribed number of symbols from the symbol constellation determined to be closest to the input sample from among the plurality of sure symbols and the at least one symbol satisfying prescribed minimum Euclidian distance criteria, the subset of best symbols being used in a subsequent iteration of (i) generating the subset of best symbol candidates and (ii) identifying the at least one symbol satisfying the prescribed minimum Euclidian distance criteria.

2. A method of detecting received data in a communication system comprising a processor, the method comprising the steps of:
    performing, by the processor, a QR decomposition on a received input vector as a function of one or more characteristics of a communication channel over which the input vector was transmitted;
    generating, by the processor, a subset of best symbol candidates from a symbol constellation by comparing an input sample with one or more prescribed thresholds, the input sample corresponding to an element of the received input vector after QR decomposition;
    identifying, by the processor, at least one symbol satisfying prescribed minimum Euclidian distance criteria among a plurality of ambiguity symbols in the subset of best symbol candidates; and
    generating, by the processor, a subset of best symbols, the subset of best symbols including a prescribed number of symbols from the symbol constellation determined to be closest to the input sample, the subset of best symbols being used in a subsequent iteration of (i) generating the subset of best symbol candidates and (ii) identifying the at least one symbol satisfying the prescribed minimum Euclidian distance criteria;
    wherein the step of generating the subset of best symbol candidates corresponding to the received input sample comprises:
    scaling the one or more prescribed thresholds as a function of at least one element of a triangular matrix obtained from the QR decomposition to generate at least one scaled threshold;
    generating a first subset of symbols, the first subset including a first symbol determined to be closest to the input sample and at least a second symbol that is a nearest neighbor of the first symbol in the symbol constellation; and
    generating a second subset of symbols, the second subset including a plurality of symbols having a prescribed likelihood of satisfying the prescribed minimum Euclidian distance criteria.

3. The method of claim 2, wherein the step of generating the subset of best symbol candidates corresponding to the received input sample further comprises:
    dividing the symbol constellation into a plurality of regions as a function of the received input sample and the at least one scaled threshold; and
    determining in which of the plurality of regions the input sample resides.

4. The method of claim 3, further comprising:
    selecting one of at least a first set of the one or more prescribed thresholds and a second set of the one or more prescribed thresholds as a function of which of the plurality of regions the input sample resides in.

5. The method of claim 3, further comprising:
    selecting one of at least a first look-up table and a second look-up table as a function of which of the plurality of regions the input sample resides in.

6. The method of claim 2, wherein the step of generating the subset of best symbol candidates corresponding to the received input sample comprises:

performing at least one comparison between the input sample and the one or more prescribed thresholds;

determining a slicer index as a function of a result of the at least one comparison; and accessing a storage element using the slicer index to obtain the first and second subsets of symbols.

7. The method of claim 2, further comprising:

calculating a metric for each symbol in the first subset of symbols; and calculating a metric for each symbol in the second subset of symbols, wherein the step of identifying the at least one symbol satisfying prescribed minimum Euclidian distance criteria is performed as a function of respective metrics calculated for each symbol in the second subset of symbols.

8. The method of claim 7, wherein the metric calculated for a given symbol in the first and second subsets of symbols comprises a distance between the given symbol and a location of the received input sample in the symbol constellation.

9. The method of claim 1, further comprising:

dividing the symbol constellation into four quadrants as a function of the received input sample and a sign of at least one element of a triangular matrix obtained from the QR decomposition; and determining in which of the four quadrants the input sample resides.

10. The method of claim 1, further comprising:

defining a first plurality of sectors corresponding to a first region in the symbol constellation, each of the first plurality of sectors being bounded by at least one of the prescribed thresholds;

defining a second plurality of sectors corresponding to a second region in the symbol constellation, each of the second plurality of sectors being bounded by at least one of the prescribed thresholds; and determining in which of the sectors the received input sample resides, an identifier of the sector in which the input sample resides being used as an offset into a storage element for obtaining the subset of best symbols.

11. The method of claim 1, further comprising:

storing the subset of best symbols determined to be closest to the received input sample and respective metrics corresponding to each symbol in the subset of best symbols for use in a subsequent iteration of one or more steps of the method.

12. The method of claim 11, wherein the metrics comprise respective Euclidian distances for each symbol in the subset of best symbols.

13. The method of claim 1, wherein the step of generating the subset of best symbol candidates comprises:

dividing the symbol constellation into a plurality of internal sectors and external sectors as a function of at least one characteristic of the communication system and of at least one user-definable parameter;

defining boundaries between the respective plurality of internal sectors and external sectors as a function of the one or more prescribed thresholds; and determining in which of the respective internal and external sectors the input sample resides.

14. The method of claim 1, further comprising:

iteratively performing the steps of (i) generating the subset of best symbol candidates and (ii) identifying the at least one symbol satisfying the prescribed minimum Euclidian distance criteria N−1 times for a communication system having an order N×N, where N is an integer.

15. The method of claim 1, further comprising:

in a last iteration of the subsequent iteration, determining a maximum likelihood solution vector of order N×1 as a function of the subset of best symbol candidates and a minimum cumulative metric obtained from previous N−1 iterations of the subsequent iteration, where N is an integer.

16. A method for detecting received data in a communication system comprising a processor, the method comprising the steps of:

dividing, by the processor, a symbol constellation corresponding to the communication system into a plurality of internal sectors and external sectors as a function of at least one characteristic of the communication system and of at least one user-definable parameter;

generating, by the processor, a set of thresholds for defining boundaries between the respective plurality of internal sectors and external sectors;

generating, by the processor, a first look-up table comprising a first subset of sure symbols and a first subset of ambiguity symbols, the first subset of sure symbols including two or more symbols in at least one of the internal sectors that are associated with a subset of best symbols, the subset of best symbols including a prescribed number of symbols in the constellation determined to be closest to an input sample corresponding to a received input vector, the first subset of ambiguity symbols including two or more symbols in at least one of the internal sectors that have a prescribed likelihood of being associated with the subset of best symbols;

generating, by the processor, at least a second look-up table comprising a second subset of sure symbols and a second subset of ambiguity symbols, the second subset of sure symbols including two or more symbols in at least one of the external sectors that are associated with the subset of best symbols, the second subset of ambiguity symbols including two or more symbols in at least one of the external sectors that have a prescribed likelihood of being associated with the subset of best symbols;

determining, by the processor, in which of the respective internal and external sectors the input sample resides;

identifying, by the processor, at least one symbol in at least one of the first and second subsets of ambiguity symbols that satisfies prescribed minimum Euclidian distance criteria as a function of a location of the input sample in the constellation; and generating, by the processor, the subset of best symbols including symbols stored in one of the first and second look-up tables as a function of the location of the input sample in the constellation and generating respective metrics corresponding to each of the symbols in the subset of best symbols for use in a subsequent iteration of one or more steps of the method.

17. An apparatus for detecting received data in a communication system, the apparatus comprising:

memory; and at least one processor coupled with the memory and operative:

(i) to perform a QR decomposition on a received input vector as a function of one or more characteristics of a communication channel over which the input vector was transmitted;

(ii) to generate a subset of best symbol candidates including a plurality of sure symbols and a plurality of ambiguity symbols from a set of symbols in a symbol constellation by comparing an input sample with one or more prescribed thresholds, the input sample corresponding to an element of the received input vector after QR decomposition;

(iii) to identify at least one symbol satisfying prescribed minimum Euclidian distance criteria among the plurality of ambiguity symbols in the set of best symbol candidates; and (iv) to generate a subset of best symbols, the subset of best symbols including a prescribed number of symbols from the symbol constellation determined to be closest to the received input sample from among the plurality of sure symbols and the at least one symbol satisfying prescribed minimum Euclidian distance criteria and to calculate respective metrics corresponding to each symbol in the subset of best symbols, the set of best symbols being used in a subsequent iteration of generating the set of best symbol candidates and identifying a symbol satisfying the prescribed minimum Euclidian distance criteria.

18. The apparatus of claim 17, wherein the metrics comprise respective Euclidian distances for each symbol in the subset of best symbols.

19. An apparatus for detecting received data in a communication system, the apparatus comprising:
memory; and
at least one processor coupled with the memory and operative:
(i) to perform a QR decomposition on a received input vector as a function of one or more characteristics of a communication channel over which the input vector was transmitted;
(ii) to generate a subset of best symbol candidates from a set of symbols in a symbol constellation by comparing an input sample with one or more prescribed thresholds, the input sample corresponding to an element of the received input vector after QR decomposition;
(iii) to identify at least one symbol satisfying prescribed minimum Euclidian distance criteria among a plurality of ambiguity symbols in the set of best symbol candidates;
(iv) to generate a subset of best symbols, the subset of best symbols including a prescribed number of symbols from the symbol constellation determined to be closest to the received input sample and to calculate respective metrics corresponding to each symbol in the subset of best symbols, the set of best symbols being used in a subsequent iteration of generating the set of best symbol candidates and identifying a symbol satisfying the prescribed minimum Euclidian distance criteria;
(v) to scale the one or more prescribed thresholds as a function of at least one element of a triangular matrix obtained from the QR decomposition to generate at least one scaled threshold;
(vi) to generate a first subset of symbols, the first subset including a first symbol determined to be closest to the input sample and at least a second symbol that is a nearest neighbor of the first symbol in the symbol constellation; and
(vii) to generate a second subset of symbols, the second subset including a plurality of symbols having a prescribed likelihood of satisfying the prescribed minimum Euclidian distance criteria.

20. The apparatus of claim 19, wherein the at least one processor is further operative:

(viii) to divide the symbol constellation into a plurality of regions as a function of the received input sample and the at least one scaled threshold; and
(ix) to determine in which of the plurality of regions the input sample resides.

21. The apparatus of claim 19, wherein the at least one processor is further operative:
(viii) to perform at least one comparison between the input sample and the one or more prescribed thresholds;
(ix) to determine a slicer index as a function of a result of the at least one comparison; and
(x) to access a storage element using the slicer index to obtain the first and second subsets of symbols.

22. An apparatus for detecting received data in a communication system, the apparatus comprising:
memory; and
at least one processor coupled with the memory and operative:
(i) to perform a QR decomposition on a received input vector as a function of one or more characteristics of a communication channel over which the input vector was transmitted;
(ii) to generate a subset of best symbol candidates from a set of symbols in a symbol constellation by comparing an input sample with one or more prescribed thresholds, the input sample corresponding to an element of the received input vector after QR decomposition;
(iii) to identify at least one symbol satisfying prescribed minimum Euclidian distance criteria among a plurality of ambiguity symbols in the set of best symbol candidates;
(iv) to generate a subset of best symbols, the subset of best symbols including a prescribed number of symbols from the symbol constellation determined to be closest to the received input sample and to calculate respective metrics corresponding to each symbol in the subset of best symbols, the set of best symbols being used in a subsequent iteration of generating the set of best symbol candidates and identifying a symbol satisfying the prescribed minimum Euclidian distance criteria;
(v) to define a first plurality of sectors corresponding to a first region in the symbol constellation, each of the first plurality of sectors being bounded by at least one of the prescribed thresholds;
(vi) to define a second plurality of sectors corresponding to a second region in the symbol constellation, each of the second plurality of sectors being bounded by at least one of the prescribed thresholds; and
(vii) to determine in which of the sectors the received input sample resides, an identifier of the sector in which the input sample resides being used as an offset into a storage element for obtaining the subset of best symbols.

23. An apparatus for detecting received data in a communication system, the apparatus comprising:
memory; and
at least one processor coupled with the memory and operative:
(i) to perform a QR decomposition on a received input vector as a function of one or more characteristics of a communication channel over which the input vector was transmitted;
(ii) to generate a subset of best symbol candidates from a set of symbols in a symbol constellation by comparing an input sample with one or more prescribed thresholds, the input sample corresponding to an element of the received input vector after QR decomposition;

(iii) to identify at least one symbol satisfying prescribed minimum Euclidian distance criteria among a plurality of ambiguity symbols in the set of best symbol candidates;

(iv) to generate a subset of best symbols, the subset of best symbols including a prescribed number of symbols from the symbol constellation determined to be closest to the received input sample and to calculate respective metrics corresponding to each symbol in the subset of best symbols, the set of best symbols being used in a subsequent iteration of generating the set of best symbol candidates and identifying a symbol satisfying the prescribed minimum Euclidian distance criteria;

wherein, in generating the subset of best symbol candidates, the at least one processor is further operative:

(v) to divide the symbol constellation into a plurality of internal sectors and external sectors as a function of at least one characteristic of the communication system and on at least one user-definable parameter;

(vi) to define boundaries between the respective plurality of internal sectors and external sectors as a function of the one or more prescribed thresholds; and (vii) to determine in which of the respective internal and external sectors the input sample resides.

* * * * *